United States Patent
Watanabe et al.

(10) Patent No.: US 6,605,414 B2
(45) Date of Patent: *Aug. 12, 2003

(54) METHOD FOR MANUFACTURING MAGNETORESISTANCE HEAD

(75) Inventors: Keiji Watanabe, Kanagawa (JP); Koji Nozaki, Kanagawa (JP); Miwa Igarashi, Kanagawa (JP); Yoko Kuramitsu, Kanagawa (JP); Ei Yano, Kanagawa (JP); Takahisa Namiki, Kanagawa (JP); Hiroshi Shirataki, Kanagawa (JP); Keita Ohtsuka, Kanagawa (JP); Michiaki Kanamine, Kanagawa (JP); Yuji Uehara, Kanagawa (JP)

(73) Assignee: Fujitsu Limtied, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/439,724

(22) Filed: Nov. 12, 1999

(65) Prior Publication Data

US 2002/0110756 A1 Aug. 15, 2002

Related U.S. Application Data

(62) Division of application No. 08/669,610, filed on Jun. 24, 1996, now Pat. No. 6,052,261.

(30) Foreign Application Priority Data

Jun. 30, 1995 (JP) ............................................. 7-165337
Dec. 26, 1995 (JP) ............................................. 7-339593

(51) Int. Cl.[7] .............................. G03F 7/30; G03F 7/36
(52) U.S. Cl. ....................... 430/319; 430/311; 430/312; 430/314; 430/394

(58) Field of Search ................................. 430/311, 312, 430/314, 319, 394; 360/113

(56) References Cited

U.S. PATENT DOCUMENTS

| | | | | |
|---|---|---|---|---|
| 4,352,870 A | * | 10/1982 | Howard | 430/271 |
| 4,425,701 A | * | 1/1984 | Takahashi | 29/603 |
| 4,470,873 A | | 9/1984 | Nakamura | 156/640 |
| 4,589,961 A | | 5/1986 | Gershenson | 204/15 |
| 4,604,176 A | | 8/1986 | Paul | 204/192 |
| 4,622,613 A | | 11/1986 | Nomura | 360/113 |
| 4,663,684 A | | 5/1987 | Kamo | 360/113 |
| 4,663,685 A | | 5/1987 | Tsang | 360/113 |

(List continued on next page.)

FOREIGN PATENT DOCUMENTS

| | | | |
|---|---|---|---|
| EP | 0590905 | | 4/1994 |
| JP | 60-53028 | * | 3/1985 |
| JP | 60-66432 | * | 4/1985 |
| JP | 4181254 | | 6/1992 |
| JP | 729119 | | 1/1995 |
| JP | 765326 | | 3/1995 |
| JP | 793726 | | 4/1995 |

Primary Examiner—Mark F. Huff
Assistant Examiner—Nicole Barreca
(74) Attorney, Agent, or Firm—Greer, Burns & Crain, Ltd.

(57) ABSTRACT

A method for manufacturing a magnetoresistance head of the present invention comprises the steps of forming an organic film on a multilayered film constituting a magnetoresistance device, forming an upper film formed of resist or inorganic film on the organic film, patterning the organic film and the upper film, cutting into edges of the organic film patterns from edges of the upper film patterns inwardly to such an extent that particles of the thin film being formed on the upper film and the multilayered film do not contact to side portions of the organic film patterns.

20 Claims, 22 Drawing Sheets

U.S. PATENT DOCUMENTS

| | | | |
|---|---|---|---|
| 4,791,171 A | * 12/1988 | Cunningham | 525/100 |
| 4,824,762 A | * 4/1989 | Kobayashi et al. | 430/258 |
| 4,827,326 A | 5/1989 | Altman | 357/67 |
| 4,871,844 A | * 10/1989 | DoMinh et al. | 540/575 |
| 4,914,538 A | 4/1990 | Howard | 360/113 |
| 4,940,511 A | 7/1990 | Fontana | 156/656 |
| 5,018,037 A | 5/1991 | Krounbi | 360/113 |
| 5,079,035 A | * 1/1992 | Krounbi et al. | 427/130 |
| 5,087,332 A | 2/1992 | Chen | 205/135 |
| 5,110,712 A | 5/1992 | Kessler et al. | 430/312 |
| 5,120,622 A | * 6/1992 | Hanrahan | 430/7 |
| 5,234,793 A | * 8/1993 | Sebald et al. | 430/323 |
| 5,360,698 A | * 11/1994 | Hanrahan | 430/324 |
| 5,391,507 A | 2/1995 | Kwasnick | 437/41 |
| 5,491,600 A | * 2/1996 | Chen | 360/113 |
| 5,527,726 A | 6/1996 | Possin | 437/41 |
| 5,532,113 A | * 7/1996 | Frechet | 430/296 |
| 5,541,128 A | 7/1996 | Kwasnick | 437/41 |
| 5,568,335 A | 10/1996 | Fontana | 360/113 |
| 6,218,056 B1 | * 4/2001 | Pinarbasi et al. | 430/5 |
| 6,306,416 B1 | * 10/2001 | Bruce et al. | 438/166 |

* cited by examiner

Fig.1 (Prior Art)
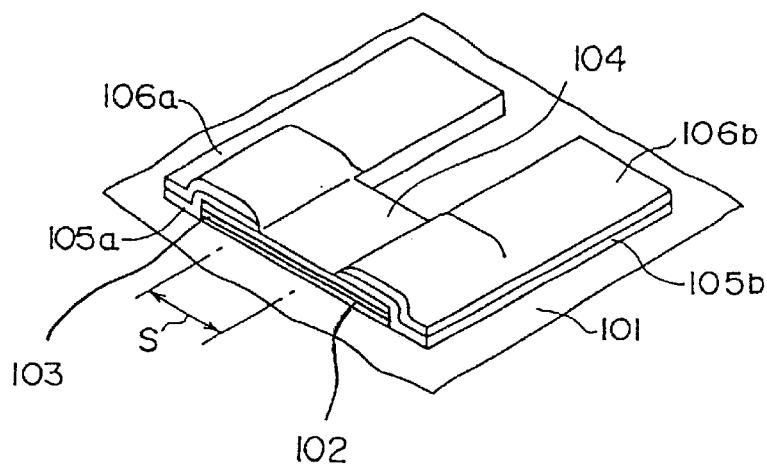
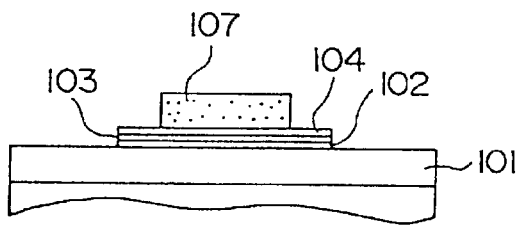
Fig.2A (Prior Art)
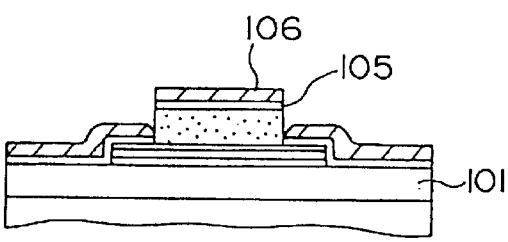
Fig.2B (Prior Art)
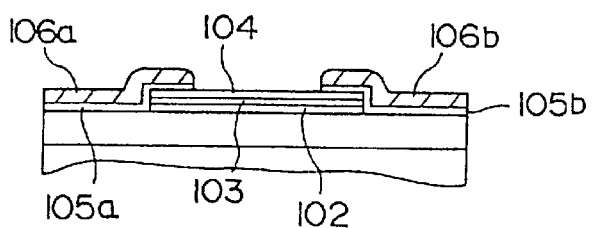
Fig.2C (Prior Art)

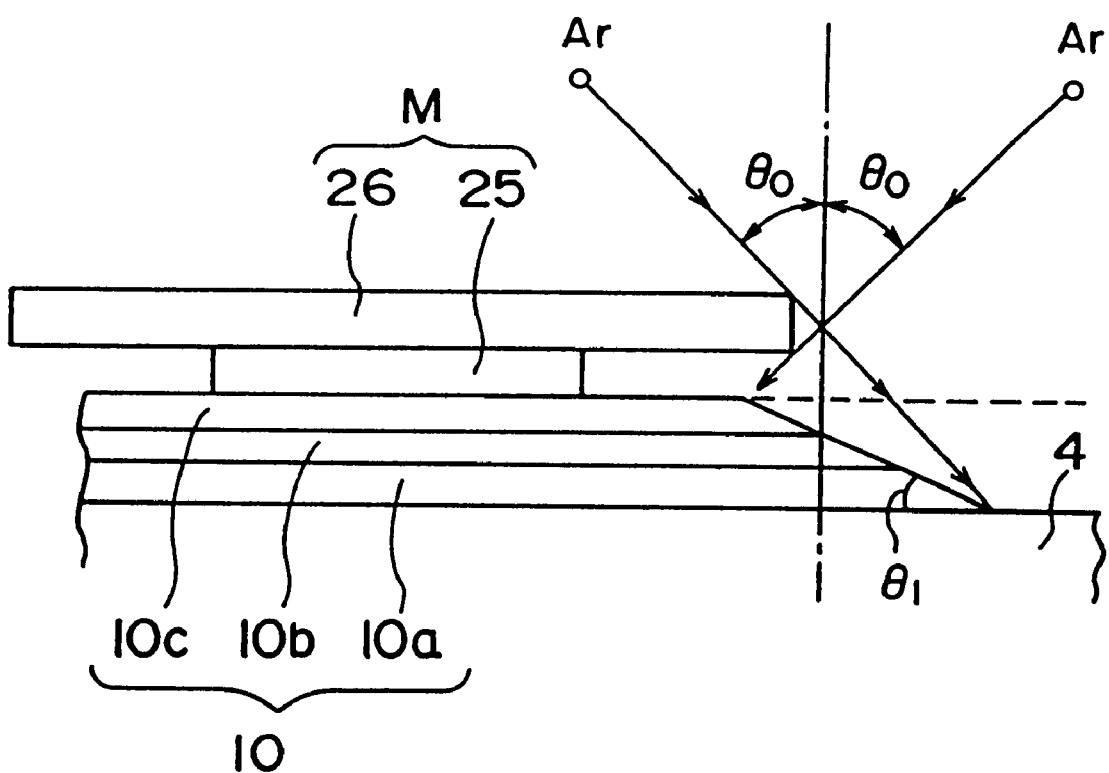

METHOD FOR MANUFACTURING MAGNETORESISTANCE HEAD

This is a divisional of application Ser. No. 08/669,610, filed Jun. 24, 1996 now U.S. Pat. No. 6,052,261, issued Apr. 18, 2000.

BACKGROUND OF THE INVENTION

1. Field of the Invention

The present invention relates to a method for manufacturing a magnetoresistance head and, more particularly, a method for manufacturing a magnetoresistance head including a step of forming patterns by virtue of lift-off technique.

2. Description of the Prior Art

A magnetoresistance head utilized as a reproducing head of a magnetic recording apparatus has the configuration as shown in FIG. 1, for instance. The magnetoresistance head is implemented by forming sequentially a SAL (Soft Adjacent Layer) 102, a nonmagnetic layer 103, and a magnetoresistance layer (referred to as "MR layer" hereinafter) 104 on a lower gap layer 101, then patterning these three layers as a planar rectangular pattern, and then forming antiferromagnetic layers 105a, 105b and lead terminals 106a, 106b on both sides of the rectangular pattern. A region formed between two lead terminals 106a, 106b serves as a sense region S.

A pair of lead terminals 106a, 106b are formed by lift-off process, as described below with reference to FIGS. 2A to 2C.

Referring to FIG. 2A, a resist 107 is coated on the rectangular pattern of the SAL 102 one time, the nonmagnetic layer 103, and the MR layer 104 and on the lower gap layer 101. The resist 107 is then patterned by exposing and developing the resist 107 so as to expose two lead terminal forming regions and to cover the sense region S on the MR layer 104. As shown in FIG. 2B, the antiferromagnetic layer 105 and the metal film 106 are formed by sputtering. In turn, the resist 107 is released to leave the metal layer 106 only on two lead terminal forming regions. The antiferromagnetic layer 105 and the metal film 106 are thus left only on two lead terminal forming regions, which are used respectively as the antiferromagnetic layers 105a, 105b and the lead terminals 106a, 106b, as shown in FIG. 2C.

However, in the event that side portions of the patterned resist are patterned to form vertical flat surfaces, there is caused such a drawback that flashes are apt to be generated on peripheries of the lead terminals 106a, 106b.

In order to suppress such flashes of the lead terminals 106a, 106b, it has been known to use the resist having a two-layered structure.

For instance, as has been recited in U.S. Pat. No 5,087,332 and Patent Application Publication (KOKAI) 3-125,311, the resist is coated two times to prepare for patterning of the gap layer in the magnetic head, then sectional shapes of the resist are formed to have a mushroom-like sectional shape by exposing and developing the resist two times, then the resist is used as a lift-off mask. In addition, the lift-off mask having such mushroom-like sectional shape in which the upper layer and the lower layer consist respectively of the resist and the $Al_2O_3$ film has been recited in Patent Application Publication (KOKAI) 7-65,326.

However, if relative misalignment of mask positions occurs during exposure process since these masks are processed by two-time patterning, the mushroom-like sectional shapes may be unbalanced on the right and left sides, otherwise the resist may be curved because the upper resist layer has projected too much laterally. Hence it becomes difficult to improve manufacturing yield of the magnetic head.

Furthermore, there are some cases where the resist having the mushroom-like sectional shape is used commonly as the lift-off mask as well as the mask for forming the magnetic layer pattern. In this event, since the resist is damaged in the course of vacuum process, constituents of the resist such as the organic substance are scattered from the resist and stick to the surface of the magnetic layer. This causes defective contacts between the magnetic layer and the lead terminals.

In addition, if release liquid for the two-layered resist and other conditions are improper, the magnetic layer is also damaged.

SUMMARY OF THE INVENTION

An object of the present invention is to provide a method for manufacturing a magnetoresistance head by which the films can be patterned with good precision and damage of the resist can be suppressed.

According to an aspect of the present invention, edges of pattern of an organic film formed to cut inwardly from edges of pattern of a resist film by forming the organic film on a multilayered film constituting a magnetoresistance device, then forming the resist film on the organic film, and then patterning the organic film and the resist film. A cut-into amount is defined to such an extent that particles of an upper thin film such as a magnetic film or a metal film which is formed by sputtering or vacuum evaporation on the organic film and the resist film do not stick to side portions of pattern of the organic film.

Therefore, even if the pattern is formed by virtue of lift-off while employing the organic film and the resist film as the mask so as to leave the upper thin film only on the multilayered film, no flash is generated on the pattern of the upper thin film.

If inorganic film is utilized in place of the resist film, generation of the flash can be prevented. In case the mask is also employed in ordinary photolithography, contaminants made of mask constituting substances can be suppressed from sticking to the magnetoresistance device by reducing scattering of the mask because of etching if the upper layer of the mask is formed of the inorganic film. In addition, in case the inorganic film is formed of metal and terminals are formed by virtue of lift-off, contact resistance between the terminal and the magnetoresistance device is in no way increased since the contaminants which adhere to the surface of the magnetoresistance device are metal.

In the present invention, in the mask of a two-layered structure having a pattern to cover the sense region, since the width of the mask is widened around the sense region, the upper layer of the mask is kept in a floating state even when the lower layer of the mask in the sense region is lost in the course of manufacturing the mask. Therefore, no trouble is caused in lift-off.

In case the lift-off mask having a substantial T-like sectional shape is formed, compressive stress is generated in the upper layer. For this reason, since the upper layer is curved downwardly, contaminants scattered from the mask may stick to the magnetoresistance device. If compressive stress is set within less than 0 $dyn/cm^2$ but more than $-20.0 \times 10^9$ $dyn/cm^2$, excessive curvature of the upper layer can be prevented.

Furthermore, if compressive stress in the upper layer of the mask is increased as its location in the upper layer becomes higher, curvature of the upper layer becomes small as the upper layer of the mask is etched even when the mask is employed in both patterning steps in photolithography and lift-off. Therefore, there is no trouble in succeeding with lift-off.

In the step where the lower film of the mask is formed of a photosensitive organic film and the upper film thereof is formed of the inorganic film, whole image exposure of the organic film may be effected prior to formation of the inorganic film. Thus, reduction in mask precision which is caused by degradation in photosensitivity because of heat generated in forming the inorganic film can be prevented.

According to another aspect of the present invention, since patterning is carried out after patterning of the magnetoresistance device is completed if the shielding film, etc. beneath the magnetoresistance device are patterned, the resist used when the magnetoresistance device is patterned is flattened, so that precise patterning of the magnetoresistance device can be implemented.

According to still another aspect of the present invention, since the multilayered film is patterned while employing the organic film and the resist film as another mask prior to patterning of the upper thin film by lift-off, time and labor for preparing the mask every patterning can be omitted and throughput can be improved. In this case, if the etching rate of the resist film on the organic film by virtue of argon sputter etching is less than 450 Å/min under the predetermined conditions, both contamination of the surface of the multilayered film by the constituents of the organic film and contamination of the surface of the nonmagnetic layer beneath the multilayered film can be extremely reduced. Furthermore, since the crosslinked negative resist or the organic silicon resin has a small etching rate by virtue of sputter etching, they are fitted for the resist material. Similarly, since the chemically amplified resist formed of material including soluble resin, crosslinking agent, and acid generating photo-generating agent also has a small etching rate, it is preferable to use the chemically amplified resist as the resist film above mentioned.

As another method for reducing the etching rate of the resist film, there is a method for curing the resist film by means of heating or excessive light irradiation. The cured resist film has the advantage that generation of contaminants can be suppressed and reduction in dimension of the resist film per se can be suppressed in etching.

In the event that patterning of the organic film is effected continuously succeeding to patterning of the resist film by the liquid developer for the resist film, pattern precision of the organic film is enhanced if the velocity of dissolution ratio is set to more than 10. If the organic film is patterned by a dry process such as oxygen plasma and while employing as the mask the resist film including organic silicon as a major constituent, a planar profile of the organic film can be readily controlled by controlling the process time.

Resin having vinyl alcohol structure, resin including carboxylic acid group, or resin including sulfonic acid suitable substances for the organic film.

In case resin including polyamic acid is used as the organic film, the organic film may be baked at a temperature of 120 to 170° C. for 1 to 20 minutes. Under remaining temperature and time, the etching rate at which the resin film is patterned is excessively fast or late, so that patterning of the organic film becomes difficult.

In the event that the photosensitive substance is employed as the lower organic film of the mask, precise latent images can be formed on the exposed organic film if the pattern of the upper resist film is used as the exposure mask for the organic film. Since irregular reflection of the light is caused in the region of the organic film which is not irradiated by the light, the light enters inwardly so that the not-exposed region of the organic film becomes narrower than the pattern of the resist film. By employing different sensitivity of photoreaction in the photosensitive organic film and the resist film, the pattern of the resist film can be formed larger than the pattern of the organic film by virtue of one-time exposure, to improve its throughput.

When the organic film is coated by spin-coating, the thickness of the organic film becomes uneven if the organic film is excessively thin. On the contrary, particles of the upper thin film formed on the resist film by sputtering readily sticks to side portions of the pattern of the organic film if the organic film is excessively thick, which causes the flash.

In order to coat the organic film and the resist film forming the mask in uniform thickness, smaller difference in the level existing beneath the mask is preferable. Therefore, after lift-off by removing the mask, it is desired to effect patterning of the nonmagnetic layer after patterning of the magnetoresistance device.

In order to prevent mixture of the organic film and the resist film, the intermediate layer may be located between them.

When the organic film is released from the resist film, the releasing rate is accelerated to improve its throughput if optimal removing liquids for respective the organic film and the resist film are used independently.

BRIEF DESCRIPTION OF THE DRAWINGS

FIG. 1 is a perspective view showing a general magnetoresistance device;

FIGS. 2A to 2C are sectional views showing processes for forming the conventional magnetoresistance head;

FIG. 9 is a fragmental sectional view showing a patterned state of the magnetoresistance device in processes for forming a magnetoresistance head according to the eighth embodiment of the present invention;

DESCRIPTION OF THE PREFERRED EMBODIMENTS

There will be described in detail preferred embodiments of the present invention with reference to accompanying drawings hereinafter.

First Embodiment

FIGS. 3A to 3H are sectional views showing processes for forming a BCS (Boundary Control Stabilizer) bias magnetoresistance head according to a first embodiment of the present invention.

Figure 3A:
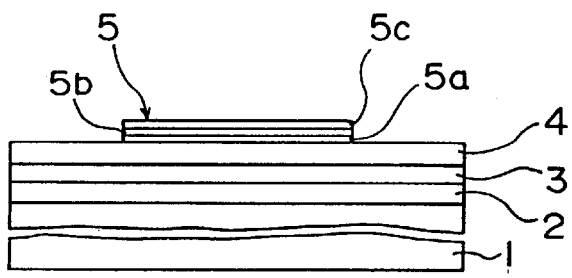
FIGS. 3A to 3H are sectional views showing processes for forming a magnetoresistance head according to a first embodiment of the present invention.

First, as shown in FIG. 3A, a nonmagnetic layer 2 formed of $Al_2O_3$ with a 14 $\mu$m thickness, a lower magnetic shielding layer 3 formed of NiFe with a 2.3 $\mu$m thickness, and a nonmagnetic insulating lower gap layer 4 formed of $Al_2O_3$ with a 200 $\mu$m thickness are formed sequentially on a substrate 1. A magnetoresistance device 5 is then formed on the lower gap layer 4 to have a planar rectangular pattern.

The magnetoresistance device 5 consists of a multilayered film in which a SAL 5a of a 20 nm thickness, a nonmagnetic layer 5b of a 10 nm thickness, and an MR layer 5c of a 20 nm thickness are sequentially formed on the lower gap layer 4. For the purposes of illustration, NiFeCr may be used as SAL material, Ta may be used as nonmagnetic material, and NiFe may be used as MR layer material.

In turn, a process for forming a mask used to form lead terminals using a of lift-off technique will then be explained hereinbelow.

Figure 3B:
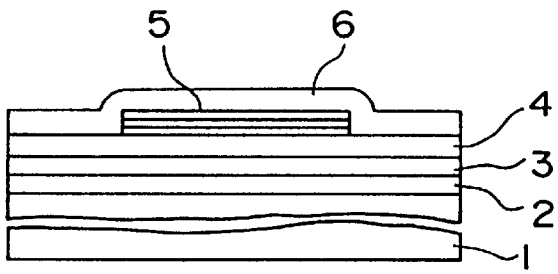

As shown in FIG. 3B, an organic film 6 made by polyamic acid (e.g., XLX10 manufactured by Nissan Chemical Industries, Ltd.) is spin-coated to have a 0.2 $\mu$m thickness, then the organic film 6 is baked at 160° C. for two minutes.

Figure 3C:
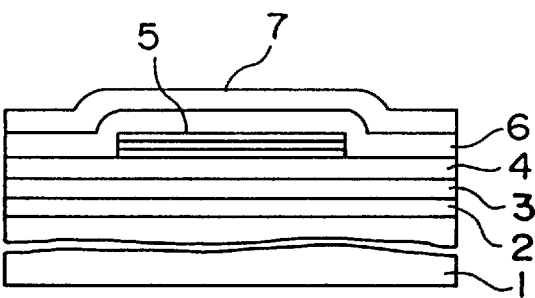

Subsequently, as shown in FIG. 3C, a chemically amplified negative resist film 7 is spin-coated on the organic film 6 to have a 2.0 $\mu$m thickness, then the chemically amplified negative resist film 7 is baked at 100° C. for two minutes. For instance, ZPP-LAX-1 available from Nippon Zeon Co. Ltd. may be used as the chemically amplified negative resist film 7.

Figure 3D:
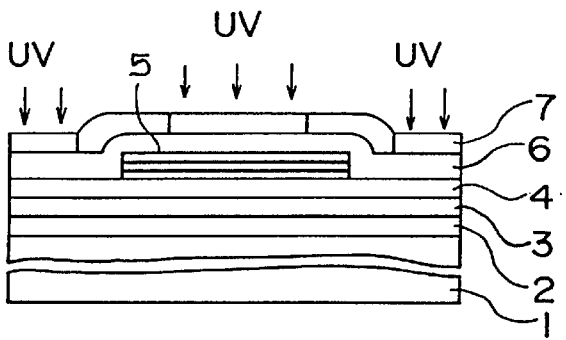

In turn, as shown in FIG. 3D, ultraviolet rays are irradiated at the quantity of 200 mJ/cm$^2$ onto the chemically amplified negative resist film 7 located in lead terminal forming regions. After this exposure, the organic film 6 and the chemically amplified negative resist film 7 are post-exposure baked at 100° C. for two minutes.

Figure 3E:
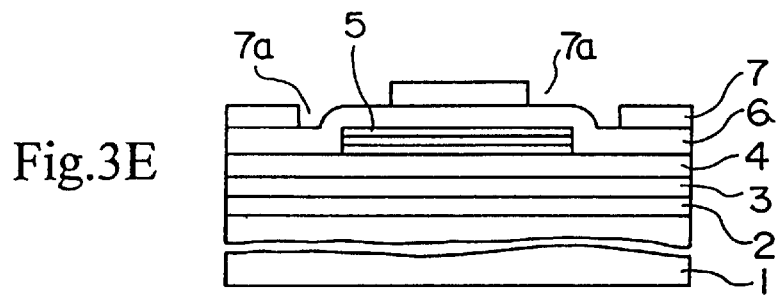
Figure 3F:
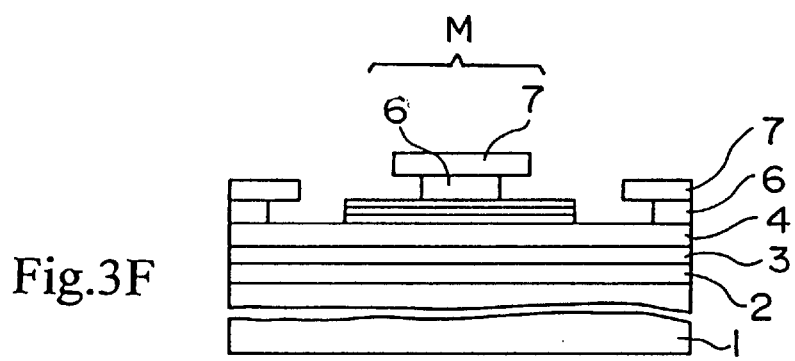

As shown in FIG. 3E, by developing the chemically amplified negative resist film 7 for 80 seconds by a liquid developer of a tetramethylammonium hydroxide aqueous solution having a concentration of 2.38 mol %, a pattern having window 7a is formed in the lead terminal forming regions including neighboring regions near both ends of the magnetoresistance device 5. When the resist film 7 is being developed, the organic film 6 is also dissolved into the liquid developer and is therefore patterned. Hence, the organic film 6 remains only beneath the chemically amplified negative resist film 7, as shown in FIG. 3F.

It is preferable that, as above, the organic film 6 can be patterned by the liquid developer for the chemically amplified negative resist film 7 simultaneously with patterning of the negative resist film 7. This is because processes can be shortened and simplified. In this case, it is preferable that, as a velocity of dissolution of the organic film 6 caused by the liquid developer, a solubility ratio defined by organic film solubility/resist film solubility is more than 10. If the solubility ratio is less than 10, it becomes difficult to control the pattern shape.

Under the above conditions, the organic film 6 has been formed such that edges of the organic film 6 cut into the chemically amplified negative resist film 7 inwardly by 1.2 $\mu$m from edges of the resist film 7. A uniform cut-into dimension has been obtained along the periphery of the pattern of the chemically amplified negative resist film 7. These facts have been confirmed by observing the pattern from the upperside thereof by virtue of the optical microscope. The pattern observation can be easily effected since the chemically amplified negative resist film 7 is made of light transmitting material. In addition, provided that the organic film 6 is formed by light absorbing material, pattern observation is further facilitated because of their clear distinction from other peripheral portions.

A mask M is formed by the organic film 6 and the chemically amplified negative resist film 7 both being patterned with the above method.

Figure 3G:
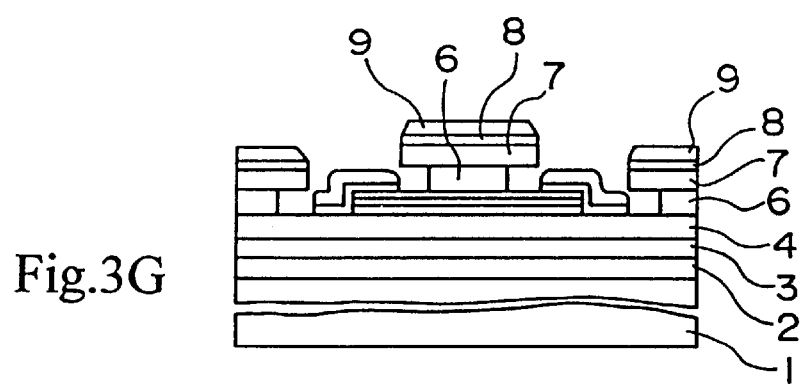
Figure 3H:
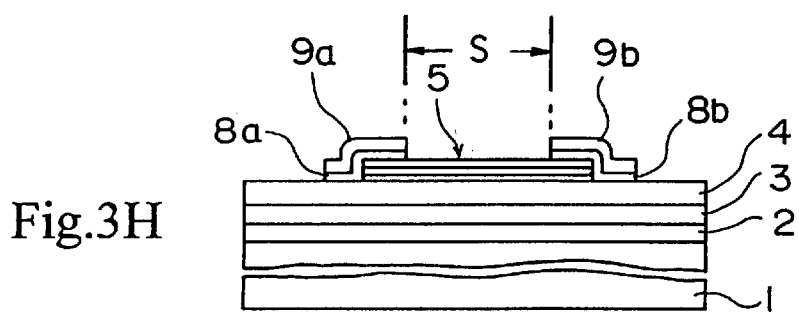

As shown in FIG. 3G, an antiferromagnetic layer 8 formed of MnFe with a 18 nm thickness and a metal film 9 formed of Au with 150 nm thickness are formed by sputtering. As shown in FIG. 3H, the organic film 6 and the chemically amplified negative resist film 7 are then removed by a solution which is made by mixing n methylpyrrolidone (NMP) and ethanolamine at the same rate. The antiferromagnetic layer 8 and the metal film 9 thereon are then lifted off. As a result, the antiferromagnetic layer 8 and the metal film 9 remain only on two lead terminal forming regions. The antiferromagnetic layer 8 is used as the BCS films 8a, 8b, and the metal film 9 is used as the lead terminals 9a, 9b. A region formed between a pair of lead terminals 9a, 9b is a sense region S.

Particles of the antiferromagnetic layer 8 and the metal film 9 do not stick to side portions of the organic film 6, which are positioned so as to cut into the chemically amplified negative resist film 7 inwardly by 1.2 μm.

Meanwhile, if the organic film 6 coated by spin-coating is less than 0.05 μm in thickness, it becomes uneven in thickness. On the contrary, if the organic film 6 is formed thicker than 1.0 μm, particles of the antiferromagnetic layer 8 and the metal film 9 would stick to side portions of the pattern of the organic film 6 since they may wrap around the resist film 7. Accordingly, it is evident that the organic film 6 has an optimum value in thickness, which has been derived in the range of 0.05 to 1.0 μm empirically and which is desired to be more than 20% of the difference in level between the magnetoresistance device 5 and its periphery. This is true for embodiments mentioned later similarly.

Subsequently, surfaces of the magnetoresistance device 5, lead terminals 9a, 9b, etc. are rinsed by means of highly volatile organic solvent such as ethanol, ethyl acetate, isopropanol, or acetone, then the surfaces are dried. It is preferable that the organic solvent is made of material having vapor pressure of more than 30 mmHg at 20° C. to shorten drying time.

After this, although not particularly shown, the lower shielding film 4 is patterned by virtue of photolithography.

In the case that a distance between a pair of lead terminals 9a, 9b (to be called as "core width" hereinafter) is set to 3 μm, variation of the core width has been within ±0.1 μm and in addition good shapes of the lead terminals 9a, 9b have been achieved without flash.

Conversely, as the conventional case shown in FIGS. 2A to 2C, the resist film (e.g., AZ5214E manufactured by Hoechst Far East Ltd.) 107 which is used commonly in lift-off is coated as a single layer and then patterned according to an image reversal method, then the metal film 106 is formed by sputtering, and thereafter the resist film 107 and the metal film 106 thereon are lifted off by employing acetone. As a result, flashes have been produced around the lead terminals 106a, 106b formed of the metal film 106, and an error of ±0.5 μm has been caused relative to the core width of 3 μm.

Therefore, it would be understood that the first embodiment of the present invention is rather effective in improvement of pattern precision of the lead terminals over conventional method.

The foregoing chemically amplified negative resist film is of crosslinked negative resist films which have high etching resistance in vacuum process. The chemically amplified negative resist film 7 consists of material including alkali soluble resin, crosslinking agent and acid generating photogenerating agent. Development after exposure is carried out after baking is done at 80 to 120° C.

Since the etching rate of the crosslinked negative resist film by virtue of argon sputtering is small, an amount of substance generated from the resist film being etched is extremely small. Hence contamination of the magnetoresistance device 5 by such substance may be suppressed. Small etching rate of the crosslinked negative resist film enables shift of the resist film in the pattern dimension to be suppressed in the vacuum process.

In the case of using a positive resist film, as molecular weight component in photosensitizers in the positive resist film are less the, etching rate of the positive resist film is smaller.

As aforementioned, it is preferable that the resist film 7 on the organic film 6 have high etching resistance in the vacuum process. In particular, if the parallel plate type reactive ion etching equipment is employed, it is desired that the resist film formed under conditions that power supplied to parallel plates in the etching equipment is 0.3 W/cm$^2$, pressure in the etching atmosphere is 20 mTorr, and the argon sputter etching rate is less than 450 Å/min.

If at least either heating or excessive exposure is carried out after the chemically amplified negative resist film 7 and the organic film 6 are developed, the chemically amplified negative resist film 7 is cured because crosslinking on the surface thereof progresses. As a result, etching resistance of the resist film 7 can be improved.

By way of example, argon sputtering may be used for rinsing the surface of the magnetoresistance device prior to formation of the metal film.

Second Embodiment

FIGS. 4A to 4H are sectional views showing processes for manufacturing a hard magnet film bias magnetoresistance head to which a method for patterning film of the present invention is applied.

Figure 4A:
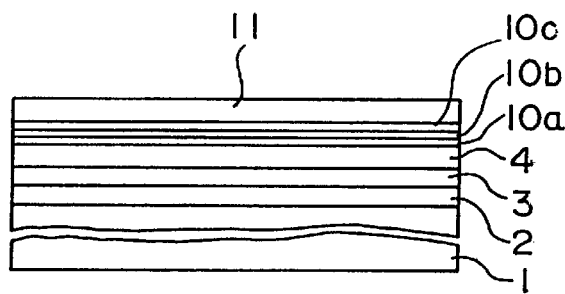
FIGS. 4A to 4H are sectional views showing processes for forming a magnetoresistance head according to a second embodiment of the present invention.

First, like the first embodiment, the substrate 1 on which the nonmagnetic layer 2, the lower magnetic shielding layer 3, and the lower gap layer 4 are formed may be used. As shown in FIG. 4A, the SAL 10a, the nonmagnetic layer 10b and the MR layer 10c are formed on the lower gap layer 4 in sequence by sputtering.

Next, an organic film 11 made by positive type glutaric imide system photosensitive resin (e.g., SF5 manufactured by Nihon MacDarmit Co., Ltd.) is spin-coated on the MR layer 10c to have a 0.2 μm thickness, and it is then baked at 260° C. for two minutes.

Figure 4B:
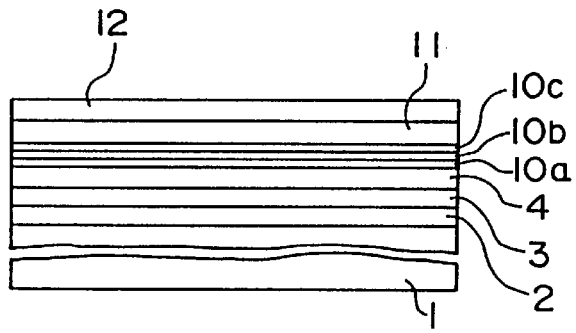

As shown in FIG. 4B, a chemically amplified negative resist film 12 is spin-coated on an organic film 11 to have a 2.0 μm thickness. Subsequently, the chemically amplified negative resist film 12 is baked at 100° C. for two minutes. The same material as that in the first embodiment may be used as the chemically amplified negative resist film 12. In this stage, the photosensitive organic film 11 is in an unexposed state.

Figure 4C:
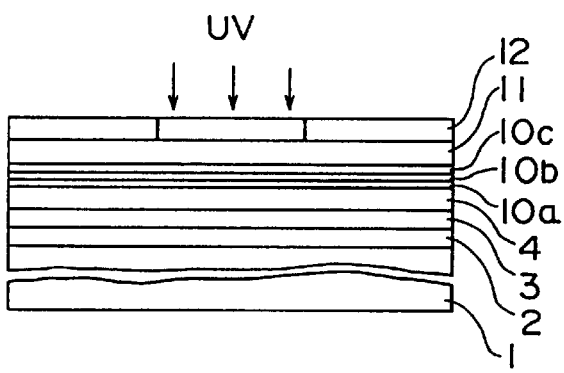

Subsequently, as shown in FIG. 4C, ultraviolet rays are irradiated at the quantity of 200 mJ/cm² onto the chemically amplified negative resist film 12 located in the sense region. After this exposure, the organic film 11 and the chemically amplified negative resist film 12 are post-exposure-baked at 100° C. for two minutes.

Figure 4D:
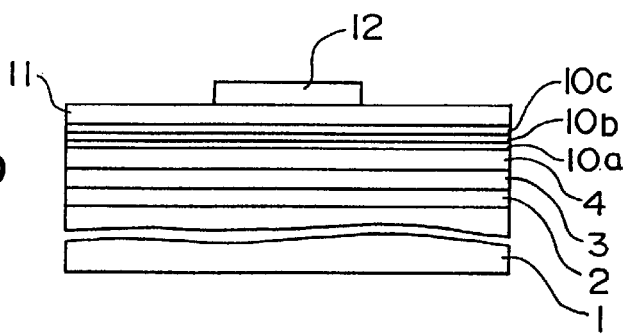

As shown in FIG. 4D, if the chemically amplified negative resist film 12 has been developed for 80 seconds by the liquid developer formed of the tetramethylammonium hydroxide aqueous solution having concentration of 2.38 mol %, the chemically amplified negative resist film 12 remains in the sense region.

Thereafter, when ultraviolet rays are irradiated at the quantity of 3.0 J/cm² onto the organic film 11, they can be absorbed by the chemically amplified negative resist film 12. Therefore, an exposure amount beneath the chemically amplified negative resist film 12 is lessened but an exposure amount of the organic film 11 is enhanced in other regions. In addition, the organic film 11 located in the region which cuts into inwardly by about 1 μm from the periphery of the chemically amplified negative resist film 12 may also be exposed because of diffraction, reflection, etc. of light.

Figure 4E:
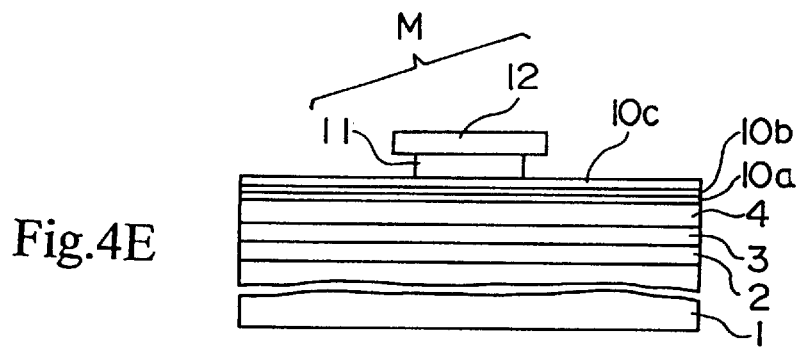

The organic film 11 is in turn developed by virtue of the tetramethylammonium hydroxide aqueous solution. As a result, as shown in FIG. 4E, it has been confirmed by the optical microscope that the organic film 11 remains beneath the chemically amplified negative resist film 12 and that peripheral portions of the organic film 11 are retreated into the region which cuts inwardly by 1 μm from edges of the chemically amplified negative resist film 12. The cut-into dimension has been uniform around the periphery of the chemically amplified negative resist film 12. The peripheral portions of the organic film 11 are substantially vertical walls.

Figure 4F:
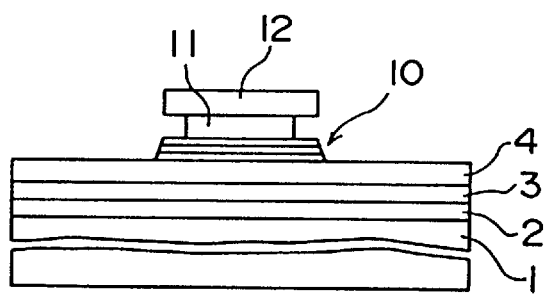

Next, as shown in FIG. 4F, the SAL 10a to the MR layer 10c are etched by argon sputter etching by employing the organic film 11 and the chemically amplified negative resist film 12 as the mask M so as to leave these layers in the region other than the sense region. Side surfaces of the SAL 10a to the MR layer 10c are etched so as to incline at 10 to 30° relative to the surface of the substrate.

The SAL 10a to the MR layer 10c are further patterned in later steps to form a rectangular magnetoresistance device 10.

Upon sputter etching, a surface of the magnetoresistance device 10 is hardly contaminated. This is because the chemically amplified negative resist film 12 has been exposed excessively to thus enhance crosslinking therein and therefore etching resistance of the resist film 12 has been enhanced, so that organic substances can be suppressed from being scattered from the chemically amplified negative resist film 12. According to the above exposure amount, the etching rate of the chemically amplified negative resist film 12 by virtue of argon sputter etching is 200 Å/min.

Figure 4G:
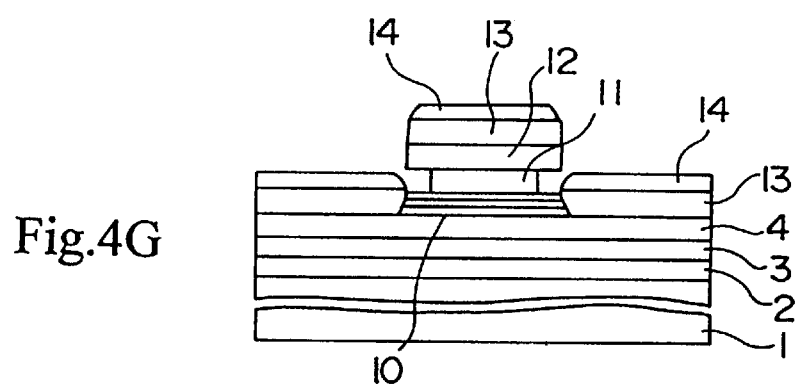

In turn, as shown in FIG. 4G, a hard magnetic film 13 formed of CoCrPt with a 30 nm thickness and a metal film 14 formed of Au with a 150 nm thickness are formed by sputtering. In this event, the hard magnetic film 13 and the metal film 14 have not adhered to side portions of the organic film 11 beneath the chemically amplified negative resist film 12. The chemically amplified negative resist film 12 and the organic film 11 are removed by means of a solution in which NMP and ethanolamine are mixed at the same rate, and then the hard magnetic film 13 and the metal film 14 thereon are lifted off.

Figure 4H:
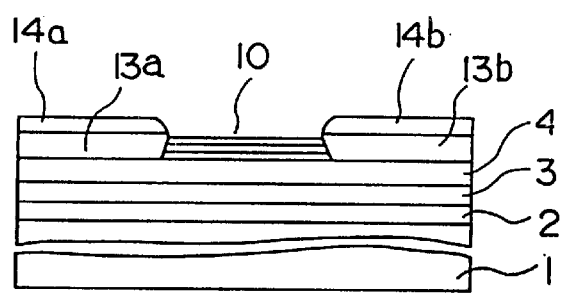

As a result, as shown in FIG. 4H, the hard magnetic film 13 and the metal film 14 remain on the lead terminal forming regions from the magnetoresistance device 10, and are patterned such that at least the hard magnetic films 13a, 13b contact respective ends of the magnetoresistance device 10. The hard magnetic film 13 is split into two regions to put the magnetoresistance device 10 between them, and the metal film 14 on the hard magnetic film 13 serve as a pair of lead terminals 14a, 14b. Subsequently, surfaces of the magnetoresistance device 10, the lead terminals 14a, 14b, etc. are rinsed by ethanol and dried. Then, although not particularly shown, by patterning the hard magnetic film 13 and the metal film 14 to have a predetermined profile, unnecessary portions are removed and the magnetoresistance device 10 is left only in the sense region to have a rectangular shape. In addition, the lower shielding film 4 is patterned in terms of photolithography.

In case the distance between a pair of lead terminals 14a, 14b (to be called "core width" hereinafter) is set to 3 μm, variation of the core width has been within ±0.1 μm and good lead terminals without flashes have been derived.

On the contrary, in case the resist film (e.g., AZ5214E manufactured by Hoechst Far East Ltd.) which is used commonly in lift-off is coated as a single layer, error of ±0.5 μm has been caused relative to the core width of 3 μm. Moreover, it has been confirmed based on SIMS analysis that sputter etching resistance of the resist film has been small the because etching rate of the resist film in argon sputtering is 500 Å/min and therefore, when the magnetoresistance device is patterned, carbons included in the resist film have stuck to edges of the lower gap layer and the magnetoresistance device to thus contaminate them. Hence, contact resistance between the lead terminals and the magnetoresistance device has been enhanced due to such carbons to exert a bad influence on a magnetic characteristic of the magnetoresistance device.

As the photosensitive positive organic film 11, there is naphthoquinonediazide system novolak positive resist film in addition to the foregoing materials.

Third Embodiment

Next, another method for forming the mask M used in lift-off will be explained.

First, polyamic acid is used as the organic film 11 shown in FIG. 4A. The polyamic acid is a precursor of polyimide. A photosensitive organic silicon resin may be used as material of the resist film 12 shown in FIG. 4B. As the photosensitive organic silicon resin, there is a resin which can be obtained by adding sensitizer to either polysiloxane or polysilucesuoxane having vinyl group and phenyl group, as recited in Patent Application Publication (KOKAI) 4-181254.

Then, as shown in FIG. 4C, after the resist film 12 is exposed by ultraviolet rays, the resist film 12 is left selectively on the sense region of the MR layer 10c by developing the resist film 12.

Subsequently, if the organic film 11 formed of polyamic acid is etched isotropically by oxygen plasma, the organic silicon constituting the resist film 12 is not etched by oxygen plasma to thus act as part of the mask M. Therefore, edges of the organic film 11 a profile that cuts inwardly from the edges of the resist film 11. A uniform cut-into dimension such as 1 μm has been derived by controlling the irradiating time of oxygen plasma.

Even by such material, variation of the core width has been within ±0.1 μm with respect to the core width of 3 μm.

The siloxane resist and the polyamic acid are removed simultaneously by means of a mixed solution of NMP and ethanolamine.

Since organic silicon resin constituting the resist film 12 has high etching resistance in vacuum process irrespective of negative or positive type resin, such resin is suitable material for the case where the liftoff mask must also be used as the sputter etching mask.

Fourth Embodiment

In the aforementioned embodiments, the resist film has been formed directly on the organic film. But in the event that a mixed layer is generated between the organic film and the resist film thereon, the precise pattern profile has not been achieved. For this reason, a countermeasure may be taken as follows.

If water soluble material is used as the organic film beneath the resist film, generation of the mixed layer of the material and the resist film can be prevented. As water soluble organic substances are there resin including polyvinyl alcohol (PVA) structures, resin including carboxylic acid groups, and resin including sulfonic acid groups. More particularly, there are copolymer (e.g., POBERL manufactured by Kuraray Co., Ltd.) of PVA, vinyl acetate, and itaconic acid; copolymer (e.g., POBERL manufactured by Kuraray Co., Ltd.) of PVA, vinyl acetate, and maleic anhydride acid; sulfonated polyanilines (e.g., SAVE manufactured by Nitto Chemical Industry Co., Ltd.); sulfonated polythiophenes (e.g., ESPAISER manufactured by Showa Denko, K.K.); and others.

In case water soluble organic substance is used as material for the organic film and it is etched, water or organic alkali aqueous solution may be used.

Figure 5:
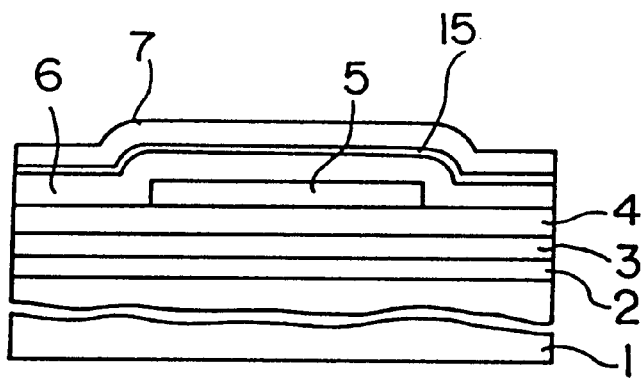
FIG. 5 is a sectional view showing a first example wherein an intermediate layer is formed between a resist film and an organic film constituting a mask for use in patterning of lead terminals, in processes for forming a magnetoresistance head according to a fourth embodiment of the present invention.
Figure 6:
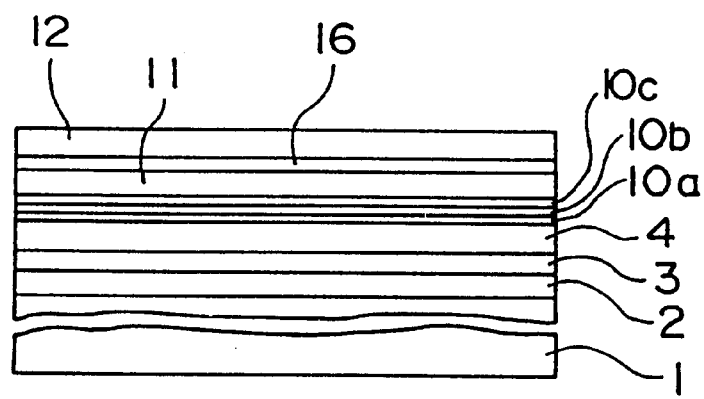
FIG. 6 is a sectional view showing a second example wherein an intermediate layer is formed between a resist film and an organic film constituting a mask for use in patterning of lead terminals, in processes for forming a magnetoresistance head according to the fourth embodiment of the present invention.

In case material which is easy to mix with the resist film is employed as the organic film, mixture of the resist film 7 and the organic film 6 can be prevented by the intermediate layer 15 which is formed of polyamic acid or water soluble organic substance and interposed between the resist film 7 and the organic film 6, as explained in the first embodiment shown in FIG. 5. Like the second embodiment shown in FIG. 6, if the intermediate layer 16 is interposed between the resist film 12 and the organic film 11, mixture of the resist film 12 and the organic film 11 can also be prevented.

If water soluble organic substance is used as the intermediate layer 15 or the intermediate layer 16 and then etched, water or organic alkali aqueous solution may be used.

Fifth Embodiment

Materials used as the organic substance above may not be limited particularly if they are not damaged when being coated with the resist film material and are formed to have a desired pattern profile. As such materials, material including polyamic acid, for example, UR5100 available from Toray Industries, Inc. and TL-X50 available from Asahi Chemical Industry Co., Ltd. may be listed. If such material is used, since velocity of dissolution of the organic film provided by liquid developer to develop the resist film is more than 10 times as large as the velocity of dissolution of remaining resist film, it is preferable to bake the organic film at a temperature of 120 to 170° C. for 1 to 10 minutes and then to form an alkali developing type resist film on the organic film. A desired cut-into dimension of the organic film has not been obtained because of small velocity of dissolution if the baking temperature of the organic film is in excess of 170° C., whereas residual of the organic film is easy to be produced if the temperature becomes higher. On the contrary, provided that the baking temperature of the organic film is lower than 120 ° C., an evenness of the profile is damaged since velocity of dissolution of the organic film is too large.

Furthermore, by employing photosensitive resin as the organic film and adjusting solubility by preliminary exposure prior to coating the resist film on the organic film, desired cut-into of the organic film can be formed with good precision.

Furthermore, if photosensitive resin is used as the organic film, the organic film pattern narrower than the resist pattern may be formed by one-time exposure if sensitivities in optical reaction of the organic film and the resist film thereon are differentiated.

For instance, provided that both the organic film and the resist film are positive ones, a desired pattern may be accomplished since an exposure region of the organic film can be broadened and thus a cut-into dimension from edges of the resist film can be firmly assured by enhancing a sensitivity in optical reaction of the organic film rather than that of the resist film. For example, kind and amount of photosensitizer in a naphthoquinonediazide system novolak positive resist film may be adjusted to cause difference in sensitivity between the photosensitive organic film and the resist film.

In the meanwhile, provided that both the organic film and the resist film are negative ones, a desired pattern may be implemented since an exposure region of the organic film is narrowed and thus a cut-into dimension from edges of the resist film can be firmly assured by enhancing a sensitivity in optical reaction of the resist film rather than that of the organic film. For example, an exposure amount and baking conditions may be controlled by combining the chemically amplified negative resist film such as SAL-601 available from Siplay Co., Ltd. and the image reversal resist film such as AZ-5213E available from Hoechst Ltd. In this case, the image reversal resist film may be used as the organic film.

It is preferable that a cut-into dimension of the organic film relative to edges of the patterned resist film is 1 to 3 times as large as the thickness of the resist film. Provided that the dimension exceeds 3 times, the metal film constituting the lead terminals may wrap around edges of the resist film to attach to side portions of the organic film because the projection amount becomes too small, which therefore causes flashes of the lead terminals.

Sixth Embodiment

In the following, release liquid for removing the organic film and the resist film as mentioned above will be explained.

In order to reduce time for the lift-off process, it is preferable to employ the release liquid which can dissolve the organic film located in the lower side more readily. It is desired to employ an organic solvent having solubility parameter $\delta$ of 9.0 to 12 if water insoluble film such as polyamic acid may be used as the organic film. In particular, it would be preferred that solution including NMP in at least 30 weight units or solution including aamines in at least 30 weight units is used. For example, there is a solution in which n-methyl-2-pyrrolidone and 2-(2-amonoethoxy) ethanol are mixed at the same rate.

In addition, water ($\delta$ is about 15 to 19) or an alkali aqueous solution may be used according to a dissolution characteristic of the lower organic film. The tetramethylammonium hydroxide aqueous solution of 0.2 to 15 wt % may be employed as the alkali aqueous solution.

When the upper resist and lower organic film are removed, the resist may be removed by the first release liquid while the organic film may be removed by the second release liquid. Especially, in case the thick resist film and the thin organic film are used, a solution having high solubility of the resist rather than the organic film may be used as the first release liquid and thereafter a solution to dissolve the organic film preferentially rather than the resist may be used as the second release liquid. This makes it possible to shorten the time required for the releasing step. For the purposes of example, there are acetone, THF, butyl acetate, etc. as the first release liquid and there are alkali aqueous solution, NMP, etc. as the second liquid.

In the above first to sixth embodiments, although the first and second layers of the lift-off mask M have been formed by the organic film and the resist respectively, the second layer may be formed by an inorganic film such as $Al_2O_3$, metal, etc. A lift-off mask M employing such an inorganic film will be explained in seventh and eighth embodiments;

Seventh Embodiment

FIGS. 7A to 7H are sectional views showing steps for manufacturing a BCS bias magnetoresistance head according to an eighth embodiment of the present invention.

Figure 7A:
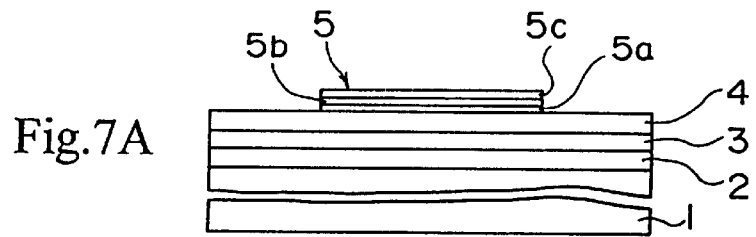
FIGS. 7A to 7H are sectional views showing processes for forming a magnetoresistance head according to a seventh embodiment of the present invention.

First, as shown in FIG. 7A, a nonmagnetic layer 2 formed of $Al_2O_3$ with a 14 μm thickness, a lower magnetic shielding layer 3 formed of NiFe with a 2.3 μm thickness, and a nonmagnetic insulating lower gap layer 4 formed of $Al_2O_3$ with a 200 μm thickness are formed sequentially on a substrate 1. A magnetoresistance device 5 is then formed on the lower gap layer 4 to have a planar rectangular pattern.

The magnetoresistance device 5 consists of a multilayered film in which a SAL 5a of a 20 nm thickness, a nonmagnetic layer 5b of a 10 nm thickness, and an MR layer 5c of a 20 nm thickness are sequentially formed on the lower gap layer 4. For instance, NiFeCr may be used as SAL material, Ta may be used as nonmagnetic material, and NiFe may be used as MR layer material.

In turn, a process for forming a lift-off mask used to form lead terminals will then be explained hereinbelow.

Figure 7B:
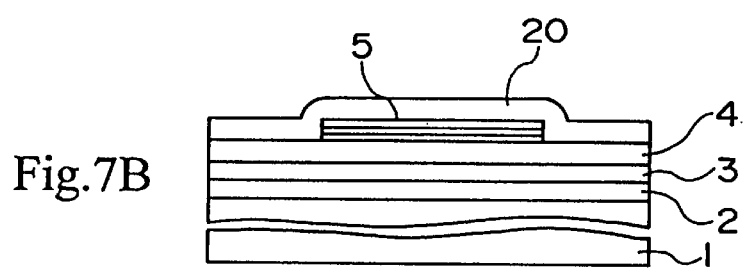

As shown in FIG. 7B, a photoresist film 20 (organic film) made by organic substance is spin-coated on the lower gap layer 4 and the magnetoresistance device 5, then the photoresist film 20 is baked. A negative or positive type photoresist may be used as the photoresist film 20 but is soluble by the liquid developer or the organic solvent.

Figure 7C:
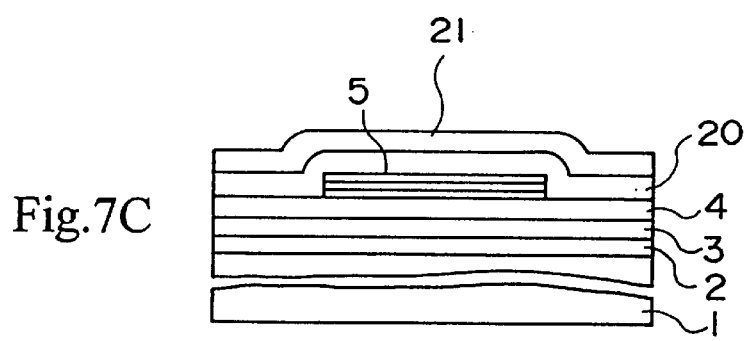

Subsequently, as shown in FIG. 7C, an inorganic film 21 such as $Al_2O_3$, $SiO_2$, $Ta_2O_5$, is formed on the photoresist film 20 by sputtering to have a thickness of 0.05 to 0.2 μm.

In turn, a second resist film 22 is coated on the inorganic film 21.

Figure 7D:
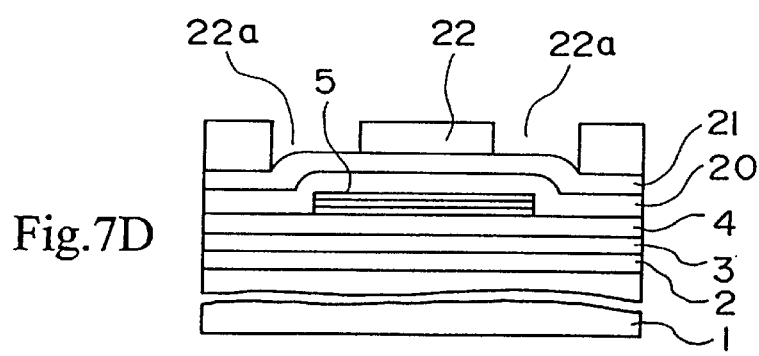

A pattern having a window 22a is formed by exposing and developing the second resist film 22 in the lead terminal forming regions including both ends of the magnetoresistance device 5, as shown in FIG. 7D.

Figure 7E:
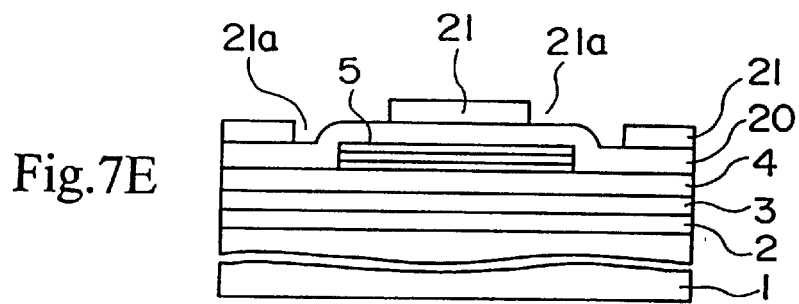

Next, when the inorganic film 21 exposed from the window 22a is etched by ion milling, opening portions 21a are formed in the inorganic film 21 to have lead terminal profiles. After forming the opening portions 21a, a sectional shape shown in FIG. 7E is formed by removing the second resist film 22.

Figure 7F:
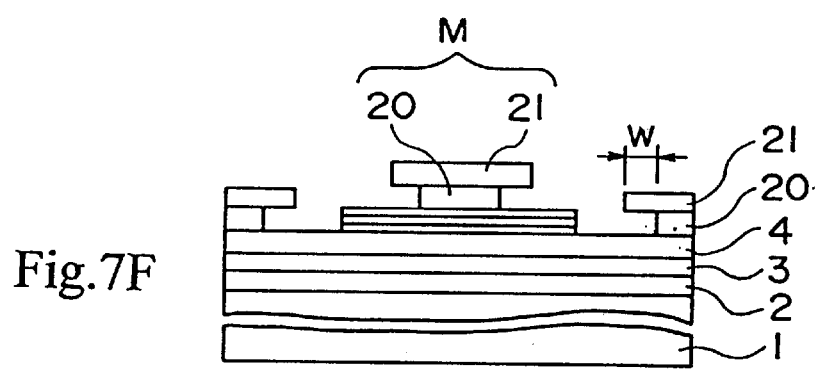

In turn, by supplying the liquid developer for resist to the opening portions 21a of the inorganic film 21, the photoresist film 20 beneath the opening portions 21a may be etched by the liquid developer isotropically. In this case, as shown in FIG. 7F, edges of the photoresist film 20 are expanded from edges of the opening portions 21a of the inorganic film 21 by a dimension of about 0.2 to 1.5 μm by retreating the resist film 20 from the opening portions 21a by about 0.2 to 1.5 μm in the lateral direction. A substantially uniform retreated amount W of the edges of the photoresist film 20 relative to the edges of the inorganic film 21 has been derived along the periphery of the pattern of the photoresist film 20.

With the above, formation of the lift-off mask M made of the photoresist film 20 and the inorganic film 21 has been completed.

Figure 7G:
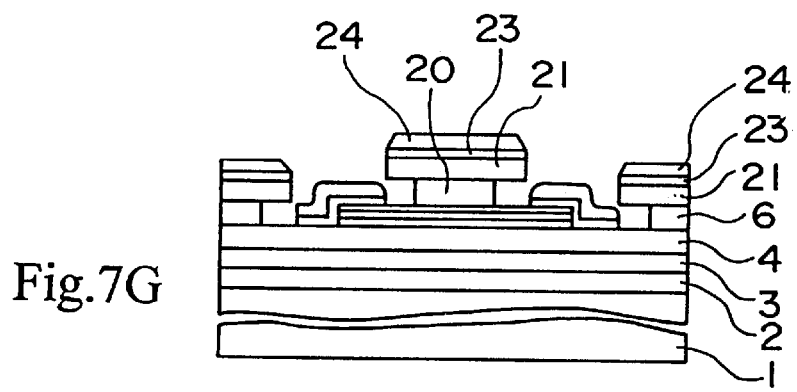
Figure 7H:
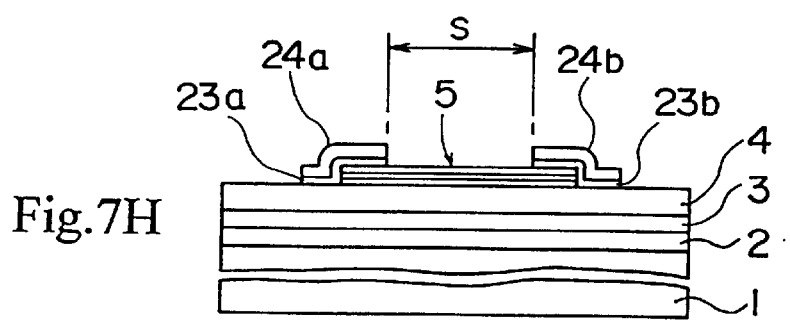

Next, as shown in FIG. 7G, an antiferromagnetic layer 23 formed of MnFe with a 30 nm thickness and a metal film 24 formed of Au with 100 nm thickness are formed by sputtering. As shown in FIG. 7H, the photoresist film 20 is then removed by the liquid developer. The inorganic film 21, the antiferromagnetic layer 23 and the metal film 24 thereon are then lifted off. As a result, the antiferromagnetic layer 23 and the metal film 24 remain only on two lead terminal forming regions. The antiferromagnetic layer 23 is used as the BCS films 23a, 23b, and the metal film 24 is used as the lead terminals 24a, 24b. A region formed between a pair of lead terminals 24a, 24b is a sense region S. A distance between a pair of lead terminals 24a, 24b in the sense region S is termed as the core width.

Particles of the antiferromagnetic layer 23 and the metal film 24 do not stick to side portions of the photoresist film 20, which are retreated inwardly to the inorganic film 21 by 0.2 to 1.5 μm. No flash has been found. In addition, variation of the core width in the sense region S has been within ±0.1 μm with respect to the core width of 3 μm. Therefore, the lead terminals 24a, 24b have been achieved with high precision.

In order to prevent generation of the flash, as shown in the first embodiment, it would be preferred that the lower photoresist film 20 of the lift-off mask M is formed to have a 0.05 to 1.0 μm thickness. It is also preferable that the thickness of the upper inorganic film 21 of the lift-off mask M is set to 0.05 to 0.5 μm.

Since the upper film of the lift-off mask M has been formed by the inorganic film 21 in the seventh embodiment, the mask M is in no way curved even if the inorganic film is thinned and the retreated amount (cut-into amount) W of the lower photoresist film 20 is increased. Hence, generation of the flash can be further surely prevented to improve yield of manufacturing. In addition, since the inorganic film 21 can attain a uniform and thin film rather than the resist and is never mixed with the lower layer material, pattern precision of the inorganic film 21 together with pattern precision of the mask M can be improved.

A light transmittable thickness of the inorganic film 21 enables the lower photoresist film 20 to be observed readily by means of a microscope.

An organic solvent in addition to the liquid developer for resist may be used to etch the photoresist film 20, otherwise, as has been explained in the third embodiment, a dry etching method such as oxygen plasma may be used.

Metal as well as the insulating substance may be used as the inorganic film 21. A two-layered structure consisting of a metal layer as the upper layer of the inorganic film 21 and an insulating layer such as $Al_2O_3$, $SiO_2$ as the lower layer thereof may be employed. In case at least the upper layer of the inorganic film 21 is formed with metal layer, it is feasible to observe a planar shape of the organic film 26 by means of the microscope if a thickness of the metal layer is set to 20 to 40 nm, for instance, so as to transmit the light. At this time, if the organic film 26 is formed with a reflection preventing material, pattern observation can be further facilitated because distinction of the pattern of the organic film 26 from other peripheral layers can be made clear.

Eighth Embodiment

FIGS. 8A to 8H are sectional views showing processes for manufacturing a hard magnet film bias magnetoresistance head to which a film patterning method is applied according to an eighth embodiment of the present invention.

Figure 8A:
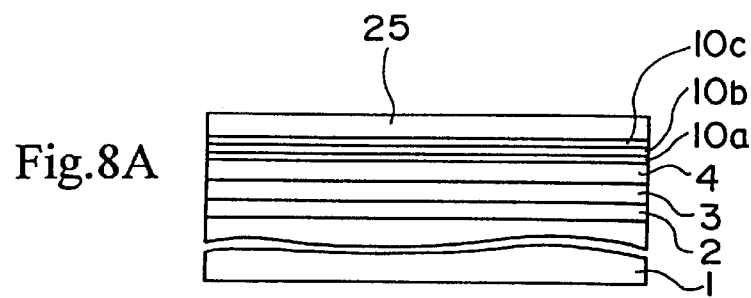
FIGS. 8A to 8H are sectional views showing processes for forming a magnetoresistance head according to an eighth embodiment of the present invention.

First, like the first embodiment, a substrate 1 is used on which a nonmagnetic layer 2, a lower magnetic shielding layer 3, and a lower gap layer 4 are formed sequentially. As shown in FIG. 8A, a SAL 10a, a nonmagnetic layer 10b, and an MR layer 10c are formed in sequence on the lower gap layer 4.

In turn, a photosensitive negative organic film 25 is spin-coated on the MR layer 10c to have a thickness of 0.05 to 0.2 $\mu$m, then the organic film 25 is baked. The organic film 25 is soluble by the liquid developer for photoresist or the organic solvent. The use of a positive type photosensitive organic film will be explained in detail in a twelfth embodiment.

Figure 8B:
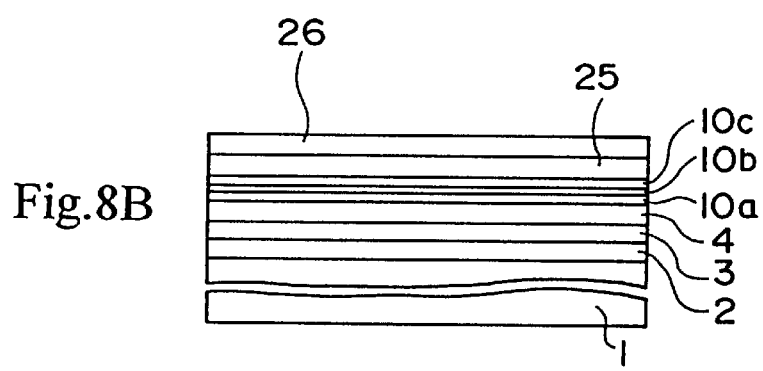
Figure 8C:
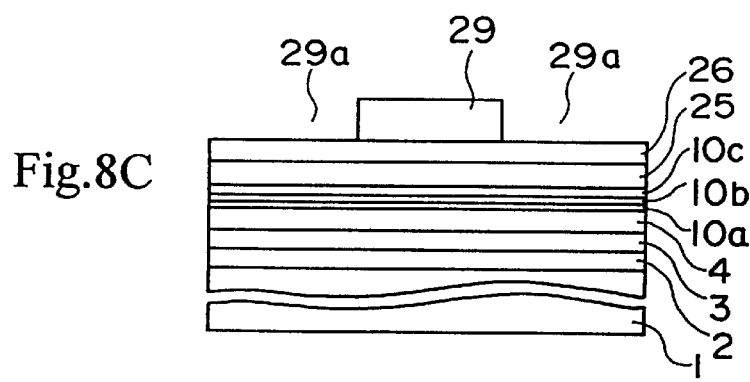

Subsequently, as shown in FIG. 8B, an inorganic film 26 such as $Al_2O_3$, $SiO_2$, $Ta_2O_5$ is formed by sputtering or vacuum evaporation to have a thickness of 0.05 to 0.2 $\mu$m. In turn, a resist film 29 is coated on the entire surface, and then a window 29a, as shown in FIG. 8C, is formed in the lead terminal forming regions by exposing and developing the resist film 29. A region formed between the lead terminal forming regions acts as the sense region S.

Figure 8D:
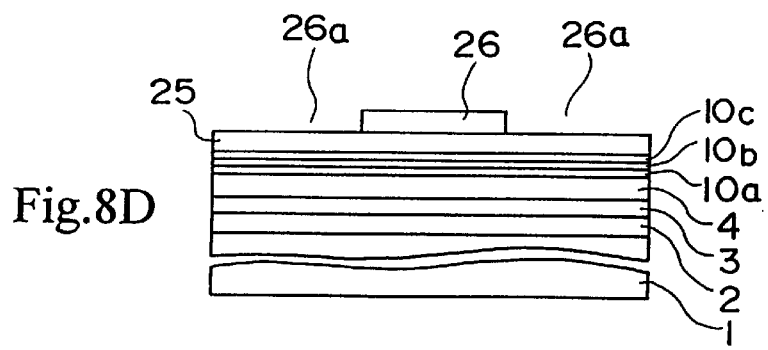

Next, when the inorganic film 26 exposed from the window 29a is etched by ion milling, opening portions 26a are formed in the inorganic film 26 to have lead terminal profiles. After forming the opening portions 26a, a sectional shape shown in FIG. 8D is obtained by removing the resist film 29.

Figure 8E:
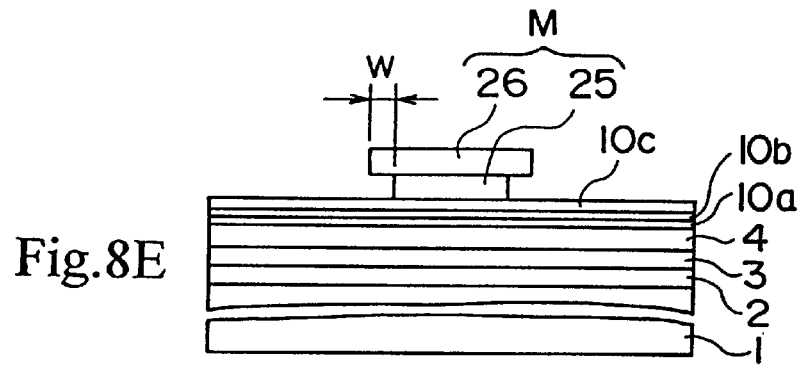

The organic film 25 may then be etched isotropically by the organic solvent or the liquid developer for photoresist. As a result, as shown in FIG. 8E, it has been confirmed by the optical microscope that the organic film 25 remains beneath the inorganic film 26 and in addition peripheral portions of the organic film 25 are retreated inwardly from edges of the inorganic film 26 by about 0.2 to 1.5 $\mu$m. The retreated amount (cut-into dimension) has been uniform around the periphery of the organic film 25. The edge portions of the organic film 25 have been derived as substantial vertical walls.

Figure 8F:
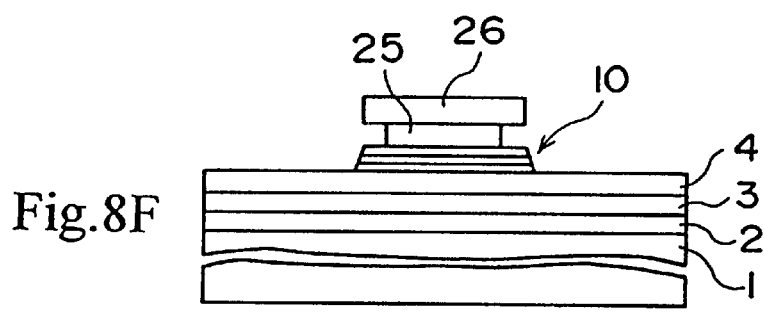

Subsequently, while using the inorganic film 26 and the organic film 25 as the mask M, the SAL 10a to the MR layer 10c are etched by ion milling by virtue of argon gas (Ar) to leave these layers in the region other than the lead terminal regions, as shown in FIG. 8F.

As shown in FIG. 9, in a state wherein an inclined angle of side surfaces of the SAL 10a to the MR layer 10c relative to the upper surface of the substrate 1 is kept at 10 to 40 degree, this etching may be effected by irradiating ions in the slant direction while rotating the substrate 1.

If the inclined angle $\theta_1$ is less than 10 degree, an area of the side surfaces becomes broad. This results in drawbacks such that miniaturization is prevented and unevenness of the shape is increased. On the other hand, the inclined angle is more than 40 degree, an contact area to lead terminals described later is lessened so that contact resistance to the lead terminals is increased.

In order to incline the side surfaces of the SAL 10a to the MR layer 10c optimally, it has been found empirically that a thickness of the organic film 27 is 0.05 to 0.2 $\mu$m, a thickness of the inorganic film 28 is 0.05 to 0.2 $\mu$m, and the retreated amount of the organic film 27 from edges of the inorganic film 28 is 0.2 to 1.5 $\mu$m. Furthermore, transmitting angle $\theta_0$ of argon ion may be 10 to 40 degree.

The SAL 10a to the MR layer 10c are still patterned in later steps to thus constitute a rectangular magnetoresistance device 10 in the sense region S.

Upon ion milling of the MR layer 10c, etc., the surface of the magnetoresistance device 10 is hardly contaminated. This is because etching resistance of the inorganic film 26 is great in contrast to the prior art employing the resist, so that a scatter amount of constituents of the mask M due to ion milling can be extremely reduced.

Figure 8G:
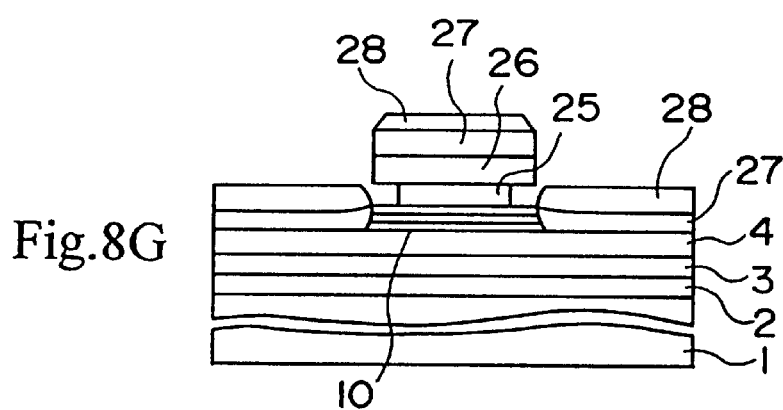

In turn, as shown in FIG. 8G, a hard magnetic film 27 formed of CoCrPt with a 30 nm thickness and a metal film 28 formed of Au with a 150 nm thickness are formed by sputtering. In this event, the hard magnetic film 27 and the metal film 28 have not adhered to side portions of the organic film 25 beneath the inorganic film 26. The hard magnetic film 27 is removed completely by means of the organic solvent or the liquid developer for photoresist, and then the inorganic film 26, the hard magnetic film 27 and the metal film 28 thereon are lifted off.

Figure 8H:
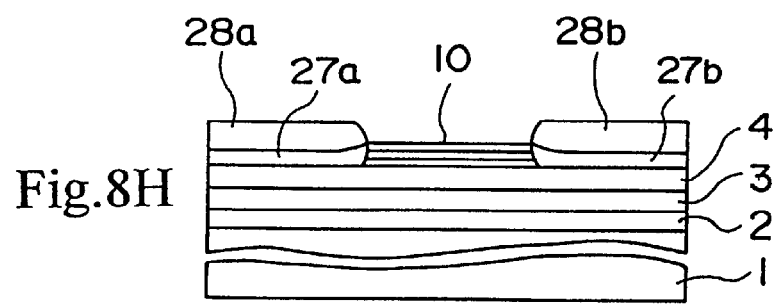

As a result, as shown in FIG. 8H, the hard magnetic film 27 and the metal film 28 remain outside of the sense region S while contacting both ends of the magnetoresistance device 10. At least the hard magnetic film 27 contacts both ends of the magnetoresistance device 10. The hard magnetic film 27 is split into two regions to put the magnetoresistance device 10 between them, and the metal films 28 on the hard magnetic films 27 serve as a pair of lead terminals 28a, 28b.

Subsequently, although not particularly shown, by patterning the magnetoresistance device 10, the hard magnetic film 27 and the metal film 28 have a predetermined profile, unnecessary portions are removed by photolithography and the magnetoresistance device 10 is left to have a rectangular shape. In addition, the lower shielding film 4 is patterned by photolithography.

In the event that the distance between a pair of leads terminals 28a, 28b (referred to as "core width" hereinafter) formed in the above steps is set to 3 $\mu$m, variation of the core width has been within ±0.1 $\mu$m and good lead terminals 28a, 28b without flashes have been derived.

According to the eighth embodiment mentioned above, since the upper layer of the lift-off mask M with an almost T-like sectional shape has been formed by the inorganic film 26 such as $Al_2O_3$, the mask M is not curved at all even if the retreated amount (cut-into amount) W of the organic film 25 beneath the inorganic film 26 is increased. Therefore, generation of the flash can be more surely prevented to thus improve yield of manufacturing. In addition, if the inorganic film 26 is employed, the upper and lower layer materials are never mixed with each other. Therefore, like the fourth embodiment, pattern precision of the mask M can be improved. Moreover, since the inorganic film 26 is ready to be formed uniformly and thin, pattern precision of the inorganic film 26 can be improved. If the inorganic film 26 is of a light transmittable thickness, the lower photoresist film 20 can be observed readily by means of a microscope.

Meanwhile, it is desired that the upper layer of the inorganic film 26 is formed of metal rather than that the whole inorganic film 26 is formed of the insulating substances. Since constituents in the upper layer of the inorganic film 26 scatter by etching to stick to the magnetoresistance device 10 when the SAL 10a to the MR layer 10c are patterned using the mask of the inorganic film 26, defective contact between the hard magnetic layer 13 and the magnetoresistance device 10 because of such scattered substances can be prevented if the upper layer is formed of metal such as a hard magnetic substance.

In case at least the upper layer of the inorganic film 26 is formed with a metal layer, it is preferable to set a thickness of the metal layer in the range from 20 to 40 nm so as to transmit light. In other words, this is because, if the inorganic film 26 has light transmittance, it is feasible to observe a planar shape of the organic film 25 by means of the microscope. Furthermore, if the organic film 25 is formed with a reflection preventing material, pattern observation can be further facilitated because distinction of the pattern of the organic film 25 from other peripheral layers can be made apparent.

An organic solvent in addition to the liquid developer may be used to etch the organic film 27, otherwise isotropic dry etching such as oxygen plasma may be used.

Ninth Embodiment

Figure 10:
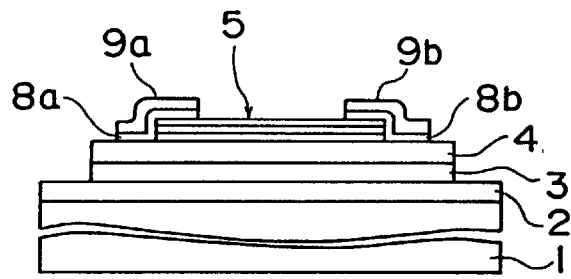
FIG. 10 is a sectional view showing a first example wherein a nonmagnetic insulating layer and a lower magnetic shielding layer are patterned in a magnetoresistance head according to a ninth embodiment of the present invention.

As shown in FIG. 10, the lower gap layer 4 and the lower magnetic shielding layer 3 in the foregoing BCS bias magnetoresistance head are patterned finally in a different step than the patterning of the magnetoresistance device 5 to have a predetermined size. This is because differences in the level between patterns of the lower gap layer 4 and the lower shielding layer 3 would prevent flatness and thickness control of the lift-off mask M and therefore lessen pattern precision of the mask M.

Figure 11:
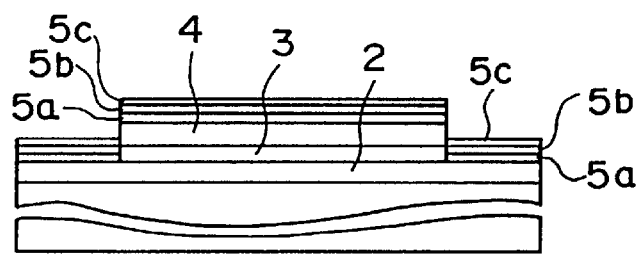
FIG. 11 is a sectional view showing a second example wherein the nonmagnetic insulating layer and the lower magnetyy shielding layer are patterned in the magnetoresistance head according to the ninth embodiment of the present invention.

Moreover, as shown in FIG. 11, note that, prior to formation of the magnetoresistance device 5 by sputtering, respective layers from the lower gap layer 4 to the lower shielding layer 3 may be patterned so as to be spread rather than a final profile of the lower shielding layer 3.

Similarly this may be true for patterning of the nonmagnetic insulating layer 2 and the lower magnetic shielding layer 3 in the foregoing hard magnet film bias magnetoresistance head.

Tenth Embodiment

In the method for manufacturing the magnetoresistance head of the foregoing eighth embodiment, the upper portion of the lift-off mask M has been formed of the inorganic film. If the inorganic film is made of oxide, inorganic substance scattered from the mask M by ion milling has inevitably contaminated the magnetoresistance device 10.

Now a method for further reducing such contamination will be explained hereinbelow.

In the tenth embodiment, the steps for forming sequentially a nonmagnetic layer 2, a lower magnetic shielding layer 3, a lower gap layer 4, a SAL 10a, a nonmagnetic layer 10b, and an MR layer 10c on a substrate 1 and then coating an organic film 25 are the same as those in FIG. 8A.

Figure 12:
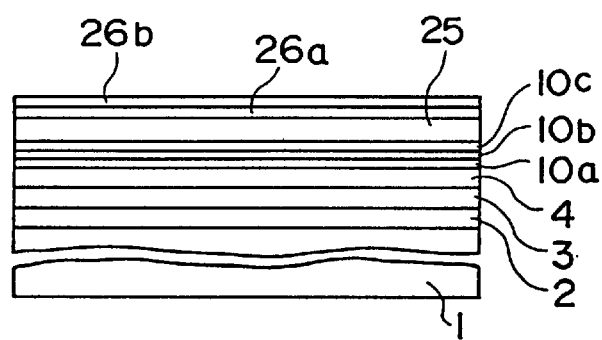
FIG. 12 is a sectional view showing a state wherein a film having a multilayered structure constituting a mask in manufacturing a magnetoresistance head according to a tenth embodiment of the present invention.

Thereafter, as shown in FIG. 12, a first inorganic film 26a formed of $Al_2O_3$ with a 100 nm thickness is formed and then a second inorganic film 26b formed of $Al_2O_3$ with a 50 nm thickness is formed. The first and second inorganic films 26a, 26b are formed by sputtering or vacuum evaporation, but pressure in growth atmosphere for growing the first inorganic film 26a must be set lower than pressure in growth atmosphere for growing the second inorganic film 26b. As a result, larger compressive pressure than that in the first inorganic film 26a resides in the second inorganic film 26b. As pressure in the growth atmosphere becomes smaller, compressive pressure is increased much more in the inorganic film such as $Al_2O_3$.

Figure 13A:
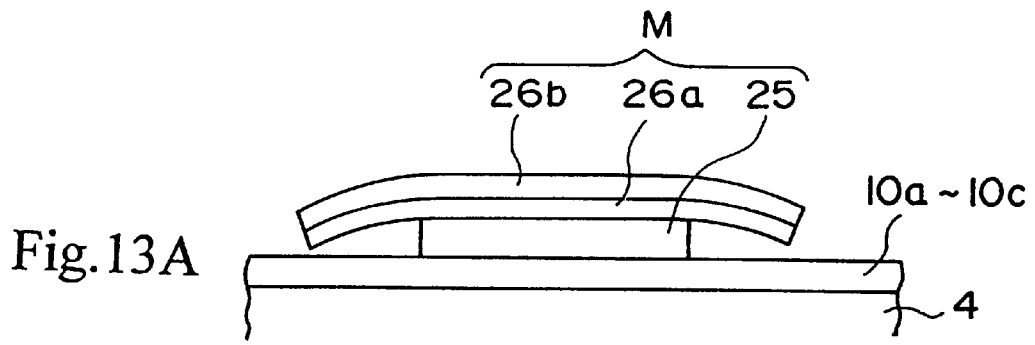
FIGS. 13A to 13D are sectional views showing steps in which a lift-off mask is used commonly to pattern a magnetoresistance device in manufacturing the magnetoresistance head according to the tenth embodiment of the present invention.

In turn, according to the method already shown in FIGS. 8C and 8D, the organic film 25 and the first and second inorganic films 26a, 26b are patterned to form a mask M, as shown in FIG. 13A. The organic film 2 in the mask M is retreated inwardly from edges of the pattern of the first and second inorganic films 26a, 26b, and in addition edges of the first and second inorganic films 26a, 26b are curved in section on both sides of the organic film 25.

Figure 13B:
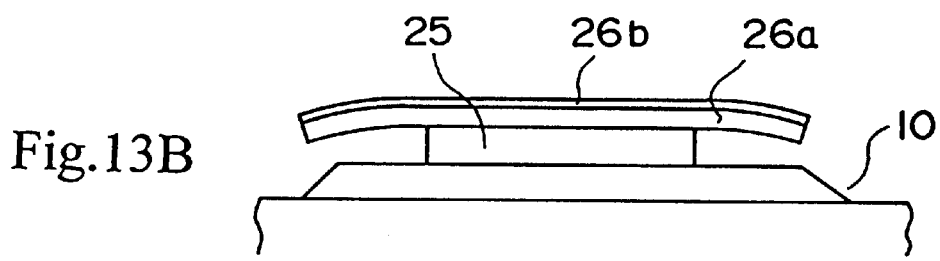
Figure 13C:
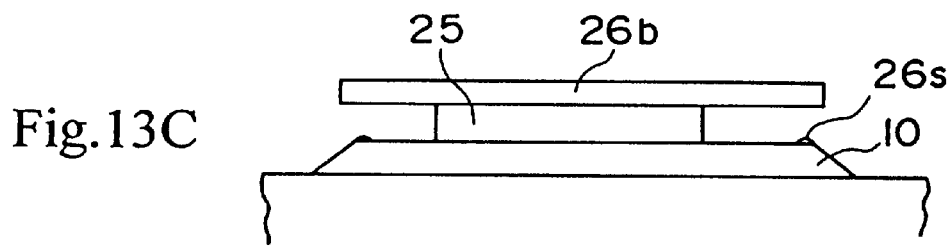

In this state, as in FIG. 8F, the SAL 10a, the nonmagnetic layer 10b, and the MR layer 10c in the region uncovered by the mask M are etched by ion milling. At this time, the second inorganic film 26b is thinned by ion milling as shown in FIG. 13B, and at the time of completing the etching the second inorganic film 26b is removed completely as shown in FIG. 13C or is slightly left slightly.

Constituent substances of the second inorganic film 26b being etched are scattered into the etching atmosphere, and then part of the second inorganic film 26b is adhered to the surface of the MR layer 10c. However, in the tenth embodiment, since the first and second inorganic films 26a, 26b are curved due to film stress distribution to approach to the MR layer 10c in the course of ion milling, adhesion of scattered inorganic substances to the MR layer 10c can be prevented. For this reason, the quantity of the adhesive 26s is significantly small.

For purposes of example, the thickness of the adhesive 26s of inorganic substance ($Al_2O_3$) on the surface of the MR layer 10c is about 5 nm in the event that the first and second inorganic films 26a, 26b are not curved, while the thickness of the adhesive 26s is about 1 nm in the event that the first and second inorganic films 26a, 26b are curved.

The SAL 10a, the nonmagnetic layer 10b, and the MR layer 10c patterned in above steps constitute the magnetoresistance device 10.

Figure 13D:
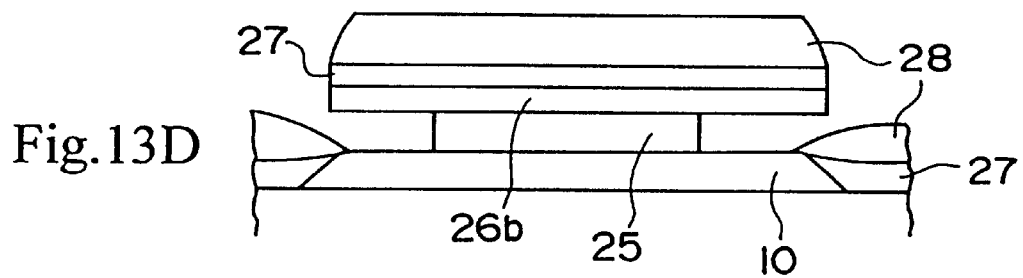

Then, as shown in FIG. 13D, a hard magnetic layer 27 and a metal layer 28 are formed by sputtering, and the hard magnetic layer 27 and the metal layer 28 are patterned after releasing the mask M. Detailed explanations are omitted because they are the same as those in the second embodiment.

Figure 14A:
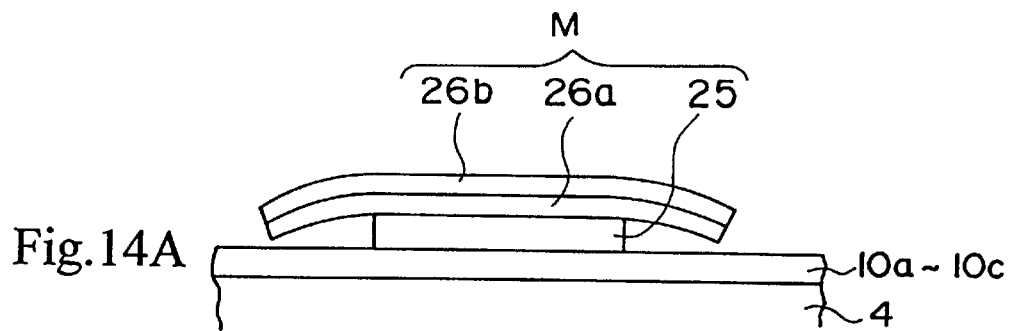
FIGS. 14A and 14B are sectional views showing another example of steps for patterning a mask and the magnetoresistance device used in the tenth embodiment of the present invention.
Figure 14B:
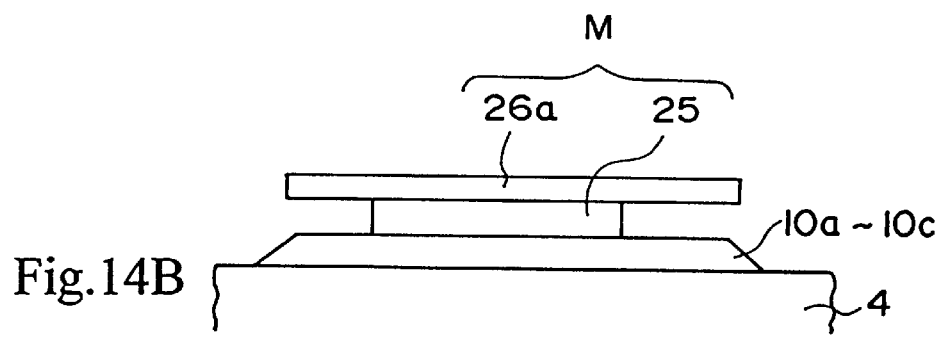

At any rate, in the foregoing explanation, although the first and second inorganic films 26a, 26b are formed of the same substance, they may be formed of different kinds of films each having different film stress to curve, as shown in FIG. 14A. In this case, the thickness of the second inorganic film 26b is set beforehand such that it can be eliminated or removed after patterning of the SAL 10a, the nonmagnetic layer 10b, and the MR layer 10c is complete.

In the above explanation, although the second inorganic film 26b has been formed of $Al_2O_3$, it may be formed of other oxide such as $SiO_2$, $Ta_2O_5$ or metal such as Ta, Ti, W. If the first and second inorganic films 26a, 26b are formed of oxide, these material may be varied, and the first inorganic film 26a may be formed of $SiO_2$ with a 100 nm thickness and the second inorganic film 26b may be formed of $Al_2O_3$ with a 50 nm thickness.

Figure 15A:
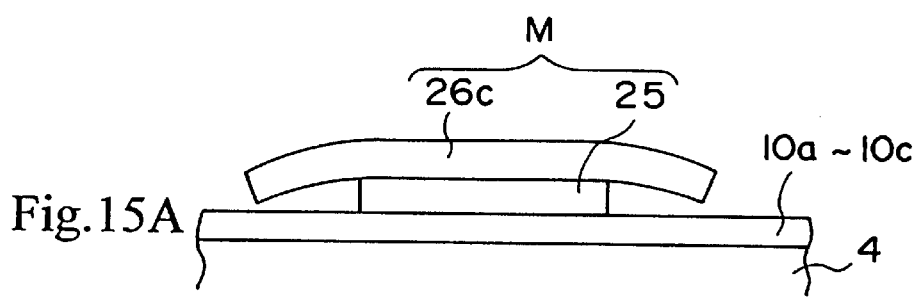
FIGS. 15A and 15B are sectional views showing still another example of steps for patterning the mask and the magnetoresistance device used in the tenth embodiment of the present invention.
Figure 15B:
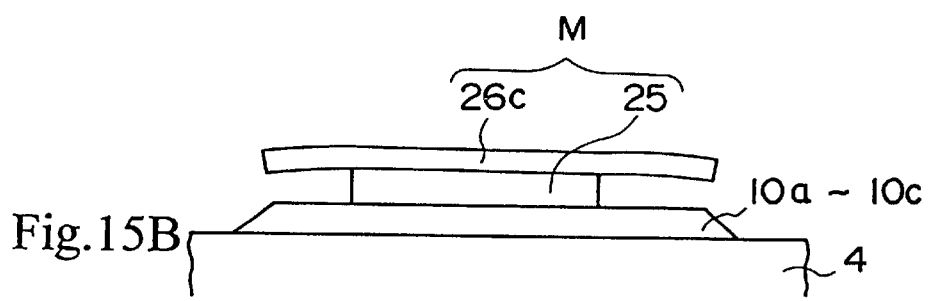

In the above example, although two layers have been formed by changing growth conditions for the inorganic film, three layers or more may be used. As the thickness of the layer is increased, compressive stress may be increased by continuously changing the growth conditions of the inorganic film. The mask M employing the inorganic film which has been fabricated by continuously changing the growth conditions is curved as shown in FIG. 15A, and the curvature becomes smaller as shown in FIG. 15B as etching of the SAL 10a, the nonmagnetic layer 10b, and the MR layer 10c advances.

The method for continuously changing the growth conditions may be applied to the case where the second inorganic film 26b is formed. In this event, for example, the first inorganic film 26a may be formed to have a 20 nm thickness and the second inorganic film 26b may be formed to have a 180 nm thickness. When pressure in the growth atmosphere for the second inorganic film 26b is reduced gradually, the mask M with less curvature may be left even if the second inorganic film 26b is not perfectly removed when the SAL 10a, the nonmagnetic layer 10b, and the MR layer 10c are patterned. As a result, lift-off is not influenced badly.

Eleventh Embodiment

In the tenth embodiment, it has been explained to first bend the upper inorganic film of the mask M to the substrate side and then eliminate such curvature when lift-off is effected. The reason why such curvature is eliminated when lift-off is effected is the following.

Figure 16:
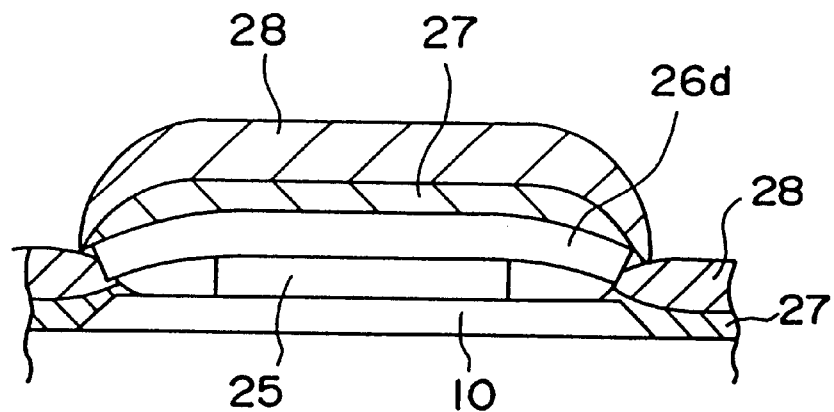
FIG. 16 is a sectional view showing an example wherein an upper layer of the lift-off mask is excessively curved downwardly.

In other words, as shown in FIG. 16, in a state where edges of the inorganic film 26d are close to the substrate side by enlarging curvature of the inorganic film 26d of the mask M, when the hard magnetic layer 27 and the metal layer 28 are formed on the mask M and the lower gap layer 4, the hard magnetic layer 27 and the metal layer 28 formed on the mask M and the hard magnetic layer 27 and the metal layer 28 formed on the lower gap layer 4 are partially connected. This partial connection causes flashes around the lead terminals.

This is because the advantages achieved by substantial T-like sectional shape of the mask M would be decreased as edges of the lift-off mask M become closer to the substrate side.

Figure 17:
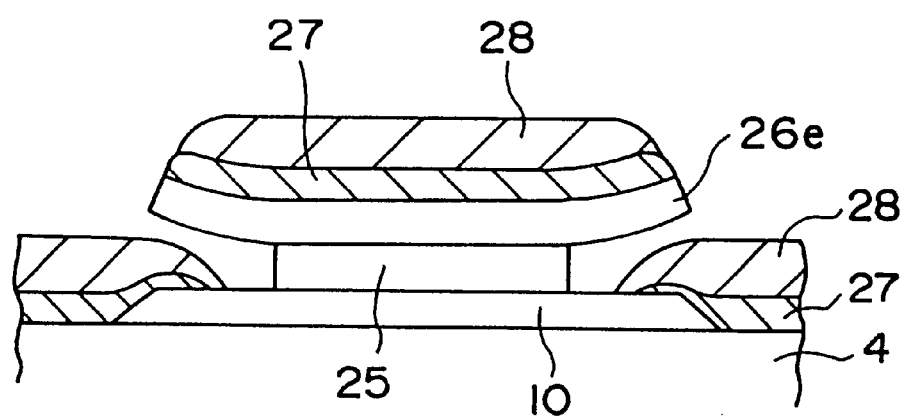
FIG. 17 is a sectional view showing an example wherein an upper layer of the lift-off mask is excessively curved upwardly.

On the contrary, as shown in FIG. 17, when the inorganic film 26e is formed so as to cause large tensile stress in its inside, the inorganic film 26e of the mask M is bent upwardly. Hence, there is no possibility burrs(flash) are generated around the lead terminals after the lift-off process. However, if the inorganic film 26e of the mask M is bent upwardly, the hard magnetic layer 27 and the metal layer 28 are ready to get into under the inorganic film 26e which being in an overhang state. Precision of the core width in the sense region S which is defined by the patterns of the hard magnetic layer 27 and the metal layer 28 is degraded.

Therefore, it would be desirable to form the inorganic film 26b with no curvature, as shown in FIG. 13D, but it is difficult to always keep the inorganic film 26b in a no stress condition. Adjustment of stress can be accomplished by controlling pressure in the atmosphere for forming the inorganic film 26b.

Figure 18A:
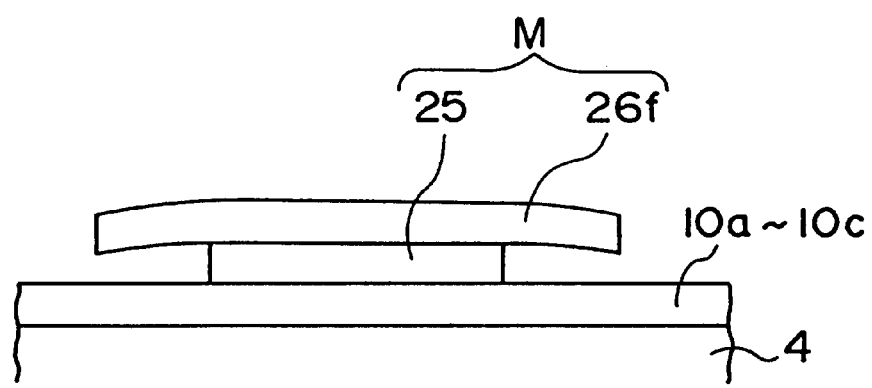
FIG. 18A is a sectional view showing a state wherein a mask is formed which is used in manufacturing a magnetoresistance head according to an eleventh embodiment of the present invention.

Hence, as shown in FIG. 18A, it would be recommended that the inorganic film 26f may be grown under the condition that compressive stress is caused to such an extent that the inorganic film 26f on the organic film of the mask M is very slightly curved downwardly.

In FIG. 18A, as explained in other embodiments, the SAL 10a, the nonmagnetic layer 10b, and the MR layer 10c are formed on the lower gap layer 4, then the organic film 25 with a 0.10 μm thickness is formed on the resultant surface, and then the inorganic film 26f with a 0.10 μm thickness is formed thereon to overhang from respective sides of the organic film 25 by about 500 nm. The mask M is thus composed of the organic film 25 and the inorganic film 26f. Internal stress of the inorganic film 26f is less than 0 dyn/cm$^2$ but more than $-20.0 \times 10^9$ dyn/cm$^2$. Negative internal stress means that the internal stress is compressive stress.

To form the inorganic film 26f is easy within a margin of such value of the internal stress. A distance between edges of the inorganic film 26f having 500 nm overhang and the MR layer 10c is 0.08 to 0.10 μm.

Figure 18B:
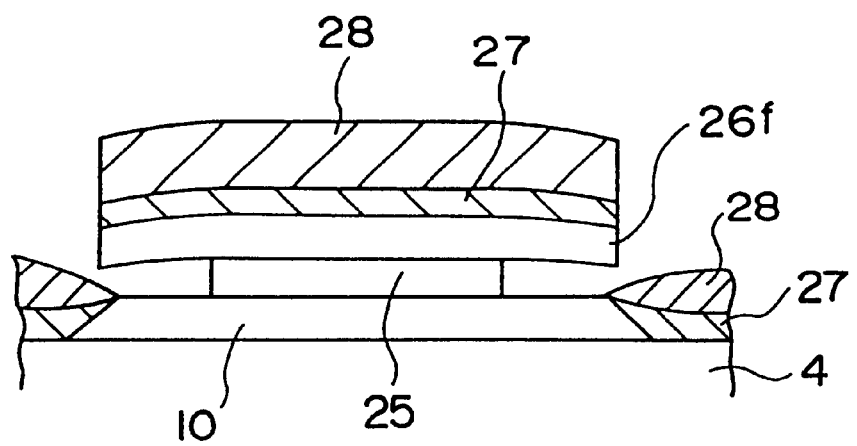
FIG. 18B is a sectional view showing a state before a terminal forming film is lifted off while employing the mask formed in FIG. 18A.

The SAL 10a, the nonmagnetic layer 10b, and the MR layer 10c which are uncovered with the mask M having such inorganic film 26f are patterned by ion milling to form the magnetoresistance device 10, and then as shown in FIG. 18B the hard magnetic layer 27 and the metal layer 28 are formed on the mask M and the ground gap layer 4. Consequently, since the hard magnetic layer 27 and the metal layer 28 formed on the mask M and the hard magnetic layer 27 and the metal layer 28 formed on the lower gap layer 4 can be perfectly separated from each other, no flash is generated on the lead terminals which are being formed by lift-off techniques.

Twelfth Embodiment

In the seventh embodiment aforementioned, the inorganic film 26 formed of insulator or metal has been formed on the organic film 25 by sputtering or vacuum evaporation, and then patterned to result in the mask M. If the inorganic substance is stacked on the organic film 25 by sputtering, the organic film 25 is heated by kinetic energy of molecules of the inorganic substance. If the organic film 25 is made of positive photoresist, chemical reaction is caused by such heating in the surface and inner regions of the photoresist so that its photosensitivity would be lost. Therefore, succeeding developing cannot be effected which interferes with formation of the mask.

Hence, the case where the positive photoresist is employed as the organic film constituting the mask M will be explained as follows.

Figure 19A:
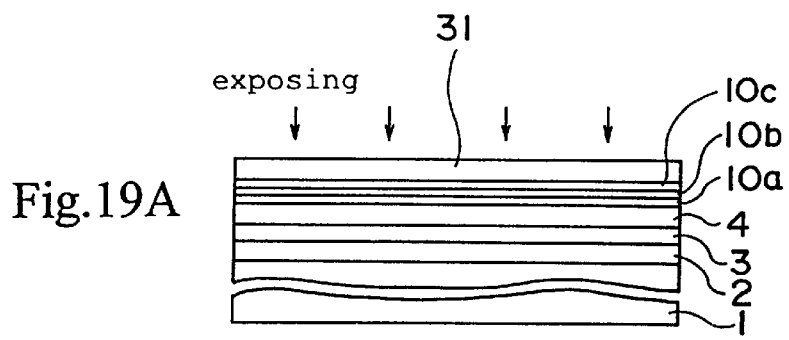
FIGS. 19A to 19H are sectional views showing processes for forming a magnetoresistance head according to a twelfth embodiment of the present invention.

First, like the first embodiment, a substrate 1 is used on which a nonmagnetic layer 2, a lower magnetic shielding layer 3, and a lower gap layer 4 are formed sequentially. As shown in FIG. 19A, a SAL 10a, a nonmagnetic layer 10b, and an MR layer 10c are formed in sequence by sputtering on the lower gap layer 4.

In turn, a first positive photoresist 31 is spin-coated as the organic film on the MR layer 10c to have a thickness of 0.05 to 0.2 μm, then the first positive photoresist 31 is whole image exposed.

Figure 19B:
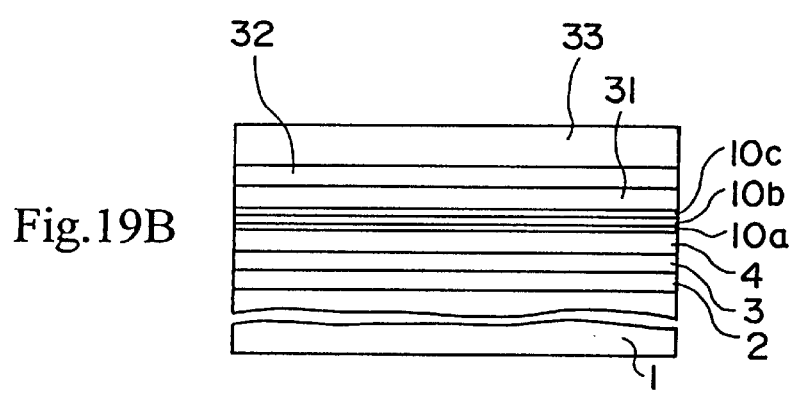

Subsequently, as shown in FIG. 19B, an inorganic film 32 formed of oxide such as $Al_2O_3$, $SiO_2$, $Ta_2O_5$ or metal such as Ti, Al is formed by sputtering or vacuum evaporation to have a thickness of 0.05 to 0.2 μm. In this case, since the first positive photoresist 31 has already been exposed, it is soluble by the liquid developer, so that defects in photosensitivity are hardly caused because of heat generated when the inorganic substance is attached to the surface of the first photoresist 31.

Figure 19C:
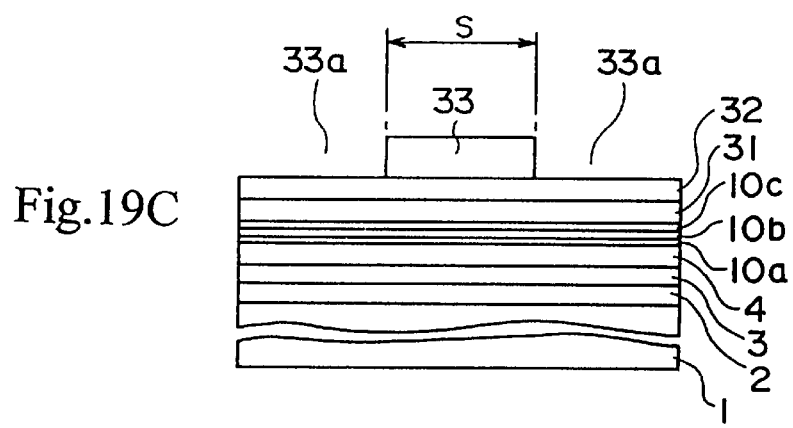

In turn, a second photoresist 33 is coated on the entire surface, and then a window 33a, as shown in FIG. 19C, is formed in the lead terminal forming regions by exposing and developing the second photoresist 33. A region formed between the lead terminal forming regions acts as the sense region S.

Figure 19D:
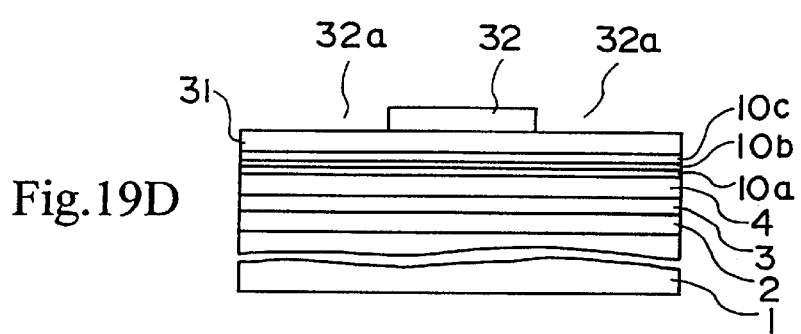

Next, when the inorganic film 32 exposed from the window 33a is etched by ion milling, opening portions 32a are formed in the inorganic film 32 to have lead terminal profiles. After forming the opening portions 32a, a sectional shape shown in FIG. 19D can be obtained by removing the second photoresist film 33.

Figure 19E:
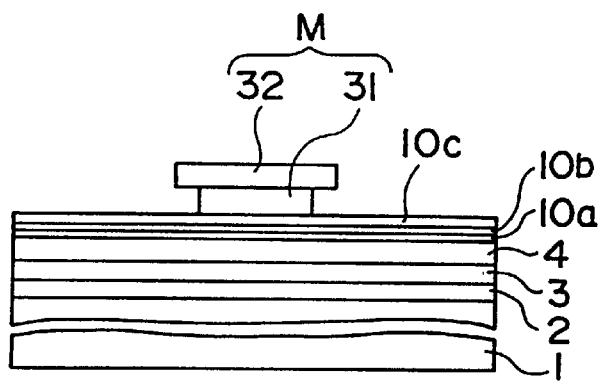

Thereafter, as shown in FIG. 19E, the first positive photoresist 31 is left beneath the inorganic film 32 by developing the first positive photoresist 31 by means of the liquid developer. The peripheral portion of the first positive photoresist 31 is retreated inwardly from the edges of the inorganic film 32 by about 0.2 to 1.5 μm.

Figure 19F:
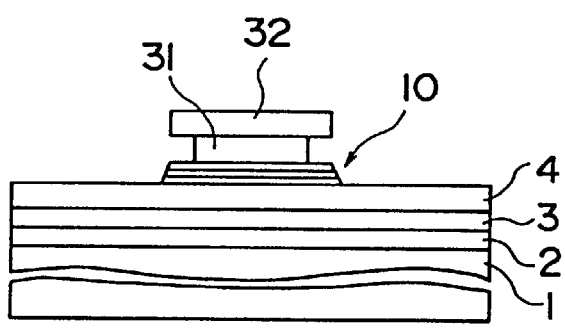

Subsequently, while using the inorganic film 32 and the first photoresist 31 as the mask M, the SAL 10a to the MR layer 10c are etched by ion milling to leave these layers in the region other than the lead terminal regions, as shown in FIG. 19F. The SAL 10a, the nonmagnetic layer 10b and the MR layer 10c located in the sense region S constitute the magnetoresistance device 10.

Figure 19G:
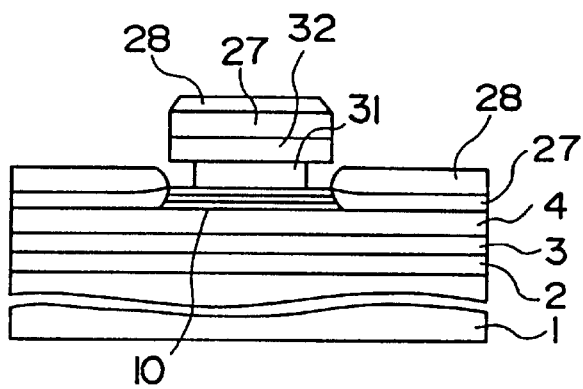

In turn, as shown in FIG. 19G, a hard magnetic film 27 formed of CoCrPt with a 30 nm thickness and a metal film 28 formed of Au with a 150 nm thickness are formed by sputtering. In this event, the hard magnetic film 27 and the metal film 28 have not adhered to side portions of the first photoresist 31 beneath the inorganic film 32. The first photoresist 31 is removed by means of the organic solvent, and then the inorganic film 32, the hard magnetic film 27 and the metal film 28 thereon are lifted off.

Figure 19H:
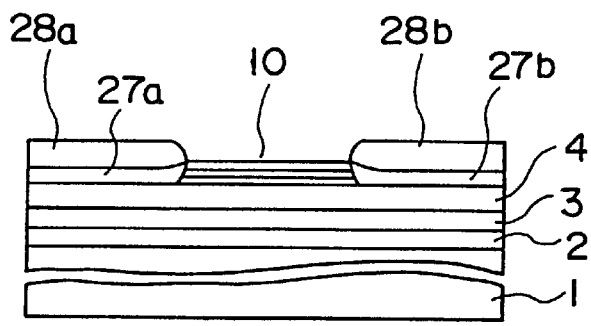

As a result, as shown in FIG. 19H, the hard magnetic film 27 and the metal film 28 remain outside of the sense region S while contacting both ends of the magnetoresistance device 10. At least the hard magnetic film 27 contacts to both ends of the magnetoresistance device 10. The hard magnetic film 27 is split into two regions to put the magnetoresistance device 10 between them, and the metal films 28 on the hard magnetic films 27 serve as a pair of lead terminals 28a, 28b.

Subsequently, although not particularly shown, by patterning the magnetoresistance device 10, the hard magnetic film 27 and the metal film 28 have a predetermined profile found by photolighography, unnecessary portions are removed and the magnetoresistance device 10 is left to have a rectangular shape. In addition, the lower shielding film 4 is patterned in terms of photolithography.

As mentioned above, if the first photoresist 31 is whole image exposed and then the inorganic film 32 is formed thereon, pattern precision of the mask M is enhanced. For this reason, yield of manufacturing can be improved.

Thirteenth Embodiment

Figure 20:
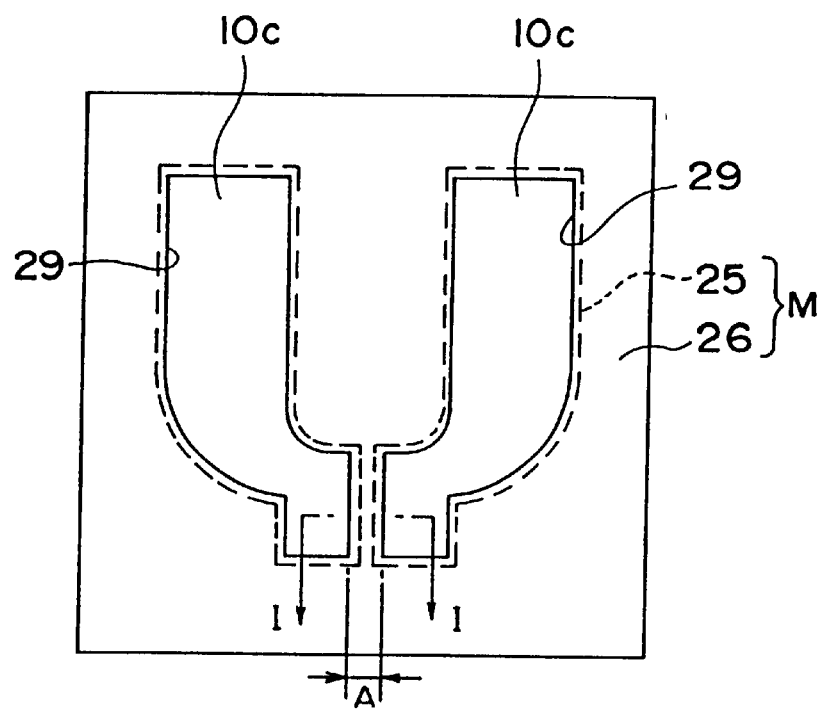
FIG. 20 is a plan view showing a lift-off mask which are used in the first to eleventh embodiments of the present invention.

In processes for manufacturing a hard magnet film bias magnetoresistance head described above, the mask M having the substantially T-shape sectional shape aforementioned is given in FIG. 20, if viewed from the upper direction. The mask M has two opening portions 29, and a planar shape of two combined opening portions 29 has about a Y-shape. Two opening portions 29 are split by a narrow region A of the mask M, and part of the narrow region A is the magnetoresistance device forming region. Figures of plural embodiments above show a sectional shape being viewed from the I—I line in FIG. 20.

Figure 21:
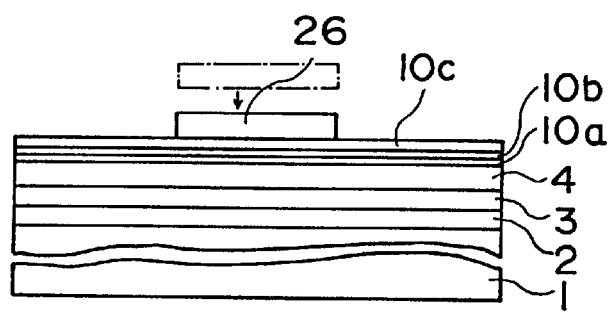
FIG. 21 is a sectional view showing a lift-off mask having a two-layered structure, in which a lower layer is lost in a narrow region in a pattern width.

Meanwhile, with the need for high density magnetic recording substances, the narrow region A of the mask M musr be formed narrower. However, if the narrow region A of the mask M is narrowed to about 1.5 $\mu$m, the organic film in the narrow region A, 25 is dissolved into the liquid developer or the organic solvent to virtually or completely disappear in the course of forming the mask M having a two-layered structure shown in FIGS. 8D, 8E, for example. Therefore, as shown in FIG. 21, the inorganic film 26 hangs down to contact to the MR layer 10c. Since a sectional shape of the mask M has a substantially rectangle shape if the inorganic film 26 contacts the MR layer 10c, flashes are inevitably generated around the lead terminals which are being formed by lift-off.

Figure 22A:
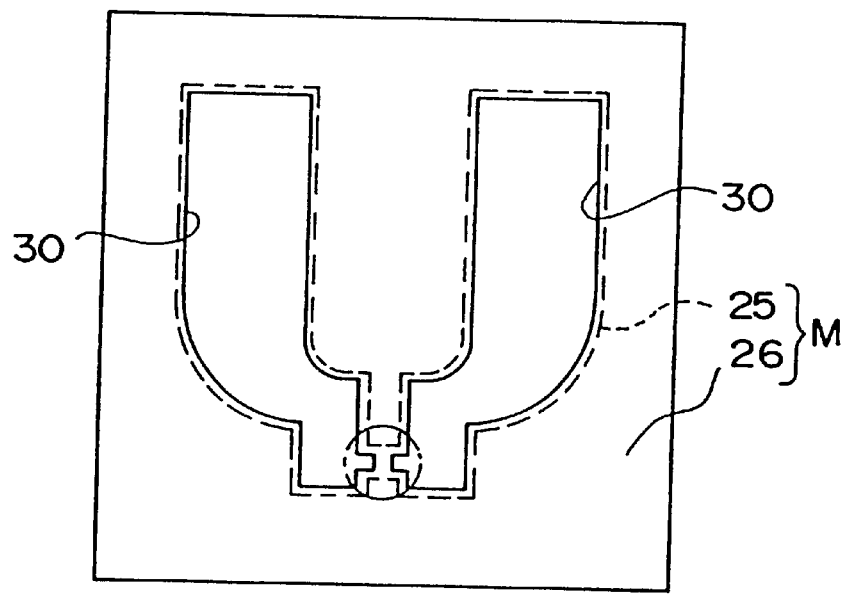
FIG. 22A is a plan view showing a lift-off mask which is used in a magnetoresistance head according to a thirteenth embodiment of the present invention.
Figure 22B:
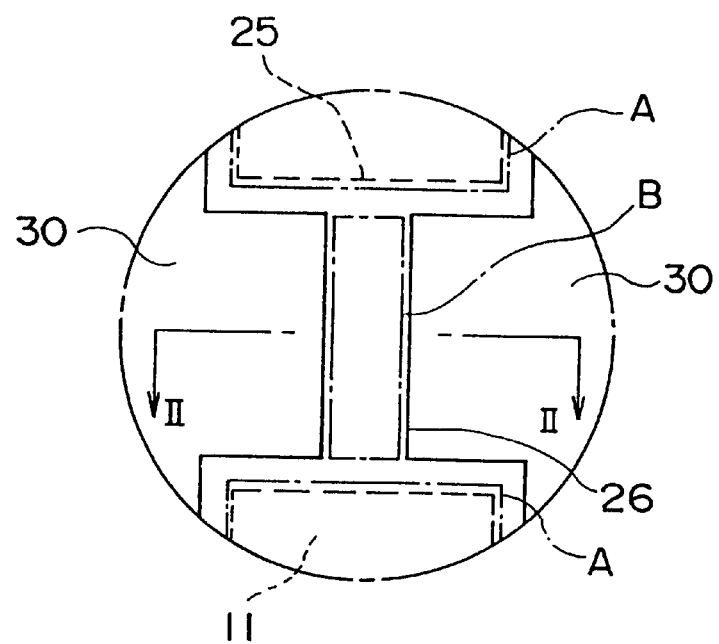
FIG. 22B is an enlarged plan view showing a magnetoresistance device forming region and its peripheral portions of the lift-off mask in FIG. 22A.

Accordingly, as shown in FIGS. 22A and 22B, the width of the narrow region A of the mask M may be widened, and also the opening 30 to narrow only the region B where at least the sense region of the magnetoresistance device is formed in the region A may be patterned in advance on the inorganic film 26.

Figure 23A:
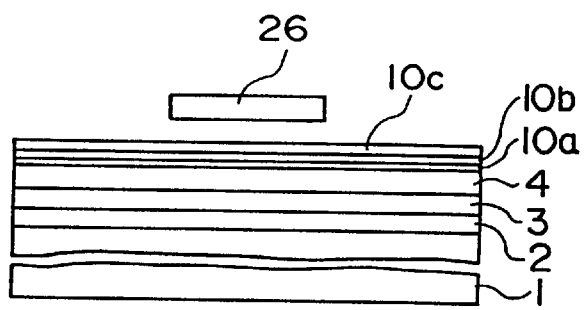
FIGS. 23A to 23D are sectional views showing processes for forming a magnetoresistance device and terminals according to the thirteenth embodiment of the present invention.

Hence, since the wide organic film 25 still remains in the region A around the sense region B even if the organic film 25 in the sense region B is once lost, the inorganic film 26 in the sense region B can be supported by the organic film 25. As a result, as shown in a sectional view of FIG. 23A, the inorganic film 26 is floated from the MR layer 10c at a distance.

Figure 23B:
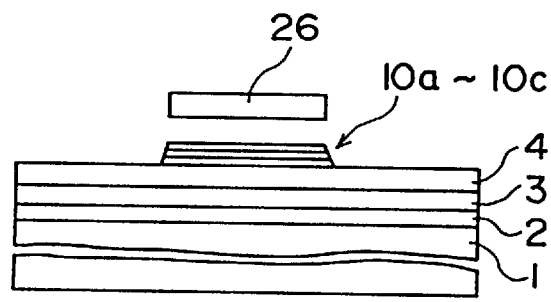

Then, as shown in FIG. 23B, while using the inorganic film 26 as the mask, the SAL 10a, the nonmagnetic layer. 10b, the MR layer 10c are removed from both sides of the sense region B by ion milling.

Figure 23C:
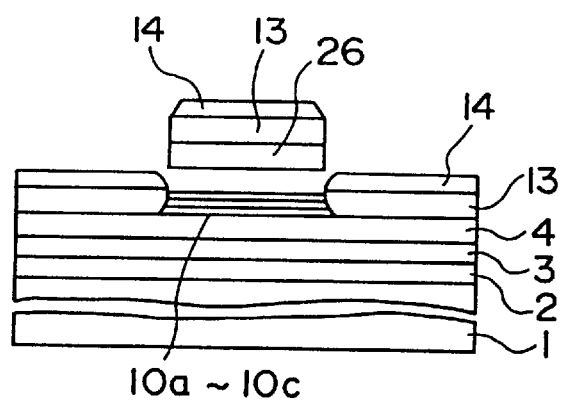
Figure 24A:
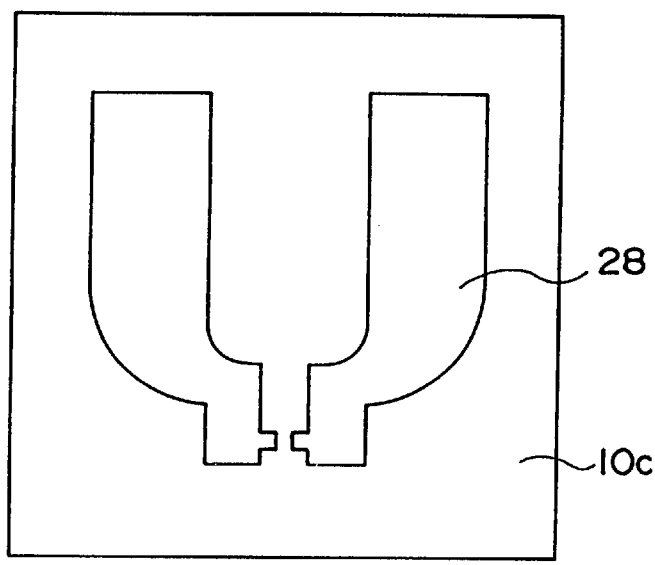
FIGS. 24A and 24B are plan views showing processes for forming the magnetoresistance device and the terminals according to the thirteenth embodiment of the present invention.

In addition, as shown in FIG. 23C, the hard magnetic layer 27 and the metal layer 28 are formed on the ground gap layer 4 and the inorganic film 26, then the inorganic film 26, the hard magnetic layer 27 and the metal layer 28 are simultaneously lifted off in the sense region B by removing the organic film 25 to be released. A planar shape as shown in FIG. 24A can thus be obtained.

After this, the SAL 10a, the nonmagnetic layer 10b, the MR layer 10c, the hard magnetic layer 27 and the metal layer 28 are sequentially patterned by virtue of photolithography, so that the SAL 10a, the nonmagnetic layer 10b, and the MR layer 10c are left only in the sense region B and simultaneously the hard magnetic layer 27 and the metal layer 28 are formed in the lead pattern profile. This patterning may be applied to the embodiments already discussed.

Figure 23D:
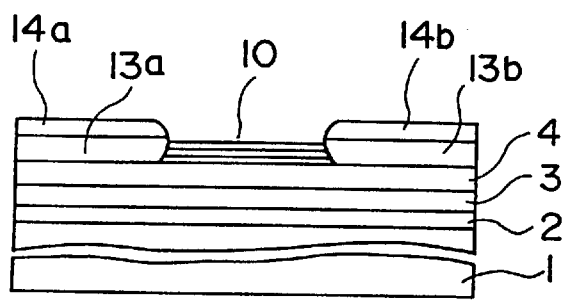
Figure 24B:
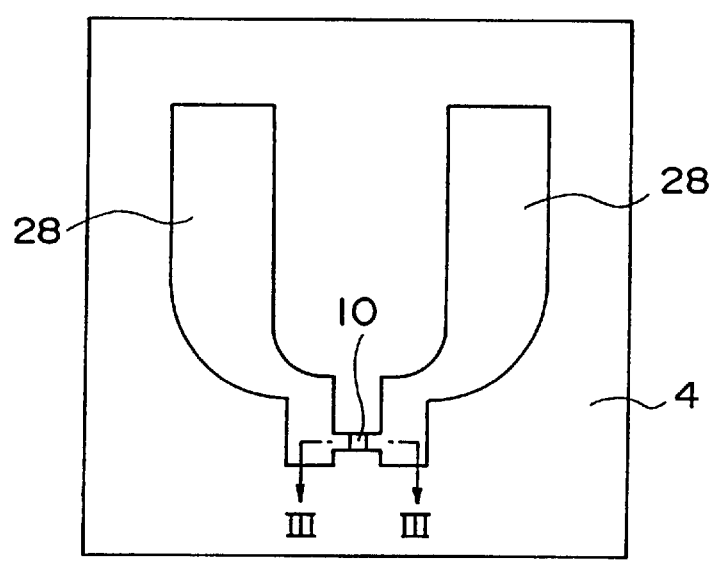

The SAL 10a, the nonmagnetic layer 10b, and the MR layer 10c being left in the sense region B constitute the magnetoresistance device 10. A planar shape of the device 10 is shown in FIG. 24B while a sectional shape taken along the line III—III is given in FIG. 23D.

The oxide and the metal illustrated in the seventh embodiment may be used as materials of the inorganic film 26 and the organic film 25.

In place of the inorganic film 26, the resist film discussed in the second embodiment may be used. In this event, the width of the mask M in the sense region B may be narrowed rather than the other region A, to eliminate the organic film in the sense region B.

Other Embodiment

Although the method for forming the pattern being applied to manufacturing of the BCS type MR head and the hard magnet type MR head has been explained in the foregoing embodiments, this method may also be applied to manufacturing of the large size magnetoresistance head.

What is claimed is:

1. A method for manufacturing a magnetoresistance head having at least one sense region formed in a stripe region, comprising the steps of:

forming a multilayered film constituting a magnetoresistance device on an insulating nonmagnetic layer;

forming an organic film of non-photosensitivity on said multilayered film;

forming a resist film on said organic film;

forming opening portions in said resist film on both sides of said stripe region by exposure and development of said resist film by a liquid developer which has larger velocity of dissolution of said organic film than that of said resist film to be remained by said development;

forming a pattern of said organic film beneath said resist film by removing said organic film by said liquid developer through said opening portions succeedingly to said development of said resist film, an edge of said pattern of said organic film being cut inwardly from edges of a pattern of said resist film to such an extent that particles of thin film formed on said resist film in later step do not wrap around side portions of said pattern of said organic film;

forming said thin film on said resist film and on said multilayered film beneath said opening portions; and patterning said thin film by peeling off said thin film with at least said resist film.

2. A method for manufacturing a magnetoresistance head according to claim 1, further comprising the step of patterning said multilayered film by etching said multilayered film while using patterns of said resist film and said organic film as a mask, prior to said step of forming said thin film.

3. A method for manufacturing a magnetoresistance head according to claim 1, wherein said thin film is a metal film serving as lead terminals.

4. A method for manufacturing a magnetoresistance head according to claim 1, wherein said thin film is either a hard magnetic film formed in regions to put said sense region therebetween or an antiferromagnetic film formed in regions to put sense regions therebetween.

5. A method for manufacturing a magnetoresistance head according to claim 4, further comprising the step of rinsing surfaces of said multilayered film and said hard-magnetic layer by organic solvent which has vapor pressure of more than 30 mmHg at 20° C. after said organic film and said resist films are peeled off.

6. A method for manufacturing a magnetoresistance head according to claim 1, wherein a dissolution ratio is more than 10, said dissolution ratio being defined as a ratio of said velocity of dissolution of said organic film to that of said resist film to be remained by said development.

7. A method for manufacturing a magnetoresistance head according to claim 1, wherein a film thickness of said organic film is within 0.05 $\mu$m to 1.0 $\mu$m.

8. A method for manufacturing a magnetoresistance head according to claim 1, wherein a film thickness of said organic film is more than 20% of a step between a top surface of said multilayered film and a surface of said nonmagnetic layer of its periphery.

9. A method for manufacturing a magnetoresistance head according to claim 1, wherein said resist film is formed of crosslinked negative resist or organic silicon resin.

10. A method for manufacturing a magnetoresistance head according to claim 1, wherein said resist film is formed of a material including soluble resin, crosslinking agent, and acid generating photo-generating agent, and is baked at a temperature of 80 to 120° C. after said exposure and before said development.

11. A method for manufacturing a magnetoresistance head according to claim 1, wherein said organic film is formed of water soluble resin, said organic film is removed through said opening portions by water or organic alkali aqueous solution.

12. A method for manufacturing a magnetoresistance head according to claim 1, wherein said organic film is formed of water insoluble resin, said organic film is removed through said opening portions by organic solvent.

13. A method for manufacturing a magnetoresistance head according to claim 1, wherein said resist film is cured by heating or light irradiation after patterns of said organic film are formed.

14. A method for manufacturing a magnetoresistance head according to claim 1, wherein said organic film beneath said resist film is formed of any one of resin including polyamic acid, resin including vinyl alcohol structure, resin including carboxylic acid group, and resin including sulfonic acid group.

15. A method for manufacturing a magnetoresistance head according to claim 1, wherein said organic film beneath said resist film is formed of resin including polyamic acid, and said organic film is baked at a temperature in the range of 120 to 170° C. for 1 to 20 minutes.

16. A method for manufacturing a magnetoresistance head according to claim 1, further comprising the step of forming an intermediate layer formed of organic material between said organic film and said resist film to prevent mixture of said organic film and said resist film.

17. A method for manufacturing a magnetoresistance head according to claim 1, wherein any one of organic solvent having solubility parameter $\delta$ of 9.0 to 12, water or alkali aqueous solution, solution including n-methylpyrrolidone in at least 30 weight units and solution including amines in at least 30 weight units is used as peeling liquid for peeling said resist film and said organic film.

18. A method for manufacturing a magnetoresistance head according to claim 1, wherein different peeling liquids are employed to peel off said resist film and said organic film respectively when said organic film and said resist film are peeled off.

19. A method for manufacturing a magnetoresistance head according to claim 1, further comprising the step of patterning said nonmagnetic layer beneath said magnetoresistance device and a lower-layer beneath said nonmagnetic layer after said thin film is lifted off.

20. A method for manufacturing a magnetoresistance head having at least one sense region formed in a stripe region, comprising the steps of:

forming a multilayered film constituting a magnetoresistance device on an insulating nonmagnetic layer;

forming an organic film on said multilayered film;

forming a resist film containing silicon and having a film thickness thicker than that of said organic film on said organic film;

forming opening portions in said resist film on both sides of said stripe region by exposure and development of said resist film;

forming a pattern of said organic film beneath said resist film by removing said organic film through said opening portions by dry process using oxygen plasma which has larger etching rate of said organic film than that of said resist film to be remained by said development, an edge of said pattern of said organic film being cut inwardly from edges of a pattern of said resist film to such an extent that particles of thin film formed on said resist film in later step do not wrap around side portions of said pattern of said organic film;

forming said thin film on said resist film and on said multilayered film beneath said opening portions; and patterning said thin film by peeling off said thin film with at least said resist film.

* * * * *

UNITED STATES PATENT AND TRADEMARK OFFICE
CERTIFICATE OF CORRECTION

PATENT NO. : 6,605,414 B2
DATED : August 12, 2003
INVENTOR(S) : Watanabe et al.

It is certified that error appears in the above-identified patent and that said Letters Patent is hereby corrected as shown below:

<u>Title page,</u>
Item [73], Assignee, please delete "Fujitsu Limtied" and insert -- Fujitsu Limited -- therefore.

Signed and Sealed this

Twenty-second Day of June, 2004

JON W. DUDAS
*Acting Director of the United States Patent and Trademark Office*